US012567032B2

(12) United States Patent
Jenkins et al.

(10) Patent No.: US 12,567,032 B2
(45) Date of Patent: Mar. 3, 2026

(54) SMART MONITORING SYSTEM

(71) Applicant: Clark Core Services, LLC, Lancaster, PA (US)

(72) Inventors: Zachary William Jenkins, Douglassville, PA (US); Nicholas Steven Geisinger, Lancaster, PA (US); Dan Sparkes, Lancaster, PA (US); Justin Charles Sheaffer, Strasburg, PA (US)

(73) Assignee: Clark Core Services, LLC, Lancaster, PA (US)

( * ) Notice: Subject to any disclaimer, the term of this patent is extended or adjusted under 35 U.S.C. 154(b) by 322 days.

(21) Appl. No.: 18/207,505

(22) Filed: Jun. 8, 2023

(65) Prior Publication Data

US 2023/0410037 A1 Dec. 21, 2023

Related U.S. Application Data

(60) Provisional application No. 63/353,761, filed on Jun. 20, 2022.

(51) Int. Cl.
| | |
|---|---|
| *G06Q 10/087* | (2023.01) |
| *G06F 9/54* | (2006.01) |
| *G06Q 10/20* | (2023.01) |

(52) U.S. Cl.
CPC ........... *G06Q 10/087* (2013.01); *G06F 9/546* (2013.01); *G06Q 10/20* (2013.01)

(58) Field of Classification Search
CPC ....... G06Q 10/087; G06Q 10/20; G06F 9/546
See application file for complete search history.

(56) References Cited

U.S. PATENT DOCUMENTS 12,192,274 B1 * 1/2025 Cowan ................. H04L 67/101
2005/0278519 A1 * 12/2005 Luebke .................. G07F 15/12
713/1

(Continued)

*Primary Examiner* — Florian M Zeender
*Assistant Examiner* — Kimberly S. Bursum
(74) *Attorney, Agent, or Firm* — Barley Snyder

(57) ABSTRACT

A smart monitoring system is described having a dashboard system, and at least one monitored appliance. The dashboard system provides a general user interface; and a computer connected to the general user interface and having: a computer readable storage device having a database module for collecting, storing and linking data associated with at least one aspect of at least one monitored appliance, and a central processing unit connected to the general user interface and the computer readable storage device and running a plurality of core modules having: a user display module providing a title display module, an appliance ID module, a current status module, and a historical status module; a user alarm module having an alarm condition module; a user alert module; a graphic display module; wherein the at least one monitored appliance having at least one sensor configured to monitor an aspect of the at least one appliance and provide a series of sensor data comprising a plurality of sequentially sensed values concerning the monitored aspect, and a communication module providing a processing unit and memory, and a transmission module configured to communicate electronically with the central processing unit of the dashboard system; and the at least one monitored appliance running a data collection module and transmitting the collected data. The smart monitoring system is configured to monitor a sensor value, provide an alert if an error is detected. The smart monitoring system is configured to monitor a sensor that is indicative of an inventory of product and provide for replenishment if the sensor value indicates low inventory of product.

20 Claims, 24 Drawing Sheets

(56)          References Cited

U.S. PATENT DOCUMENTS

| | | | | |
|---|---|---|---|---|
| 2007/0150819 A1* | 6/2007 | Goodman | ............... | G06F 16/95 |
| | | | | 707/E17.107 |
| 2008/0203267 A1* | 8/2008 | McCalley | ............. | F24H 9/0094 |
| | | | | 126/110 D |
| 2009/0240377 A1* | 9/2009 | Batzler | ............. | G05B 23/0216 |
| | | | | 340/584 |
| 2022/0215339 A1* | 7/2022 | Borke | ................ | G06Q 10/0875 |
| 2022/0374855 A1* | 11/2022 | Balaoro | ................. | H04W 4/80 |
| 2023/0360108 A1* | 11/2023 | Alvo | ................. | G06Q 30/0633 |
| 2024/0118702 A1* | 4/2024 | Cella | ................. | G06Q 10/0833 |

* cited by examiner

Dispenser Logic For Sampling And Uploading

FIG. 3

Data Processing Logic - Roll Paper Products - Dispenser Level Logic

How data moves under the hood.

Smart device on fridge registers a monitored field change.

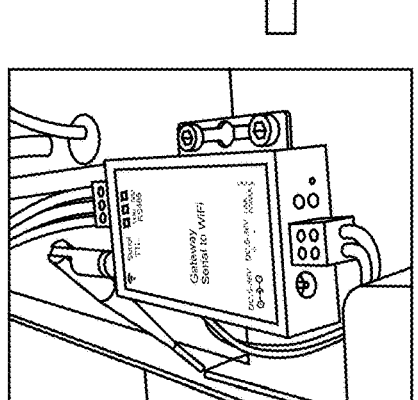

A message is published to the MQTT server.

Message 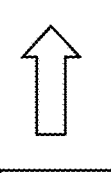 →

Message Queue

Message #2

Message #1

Consumer processes the message and updates the database.

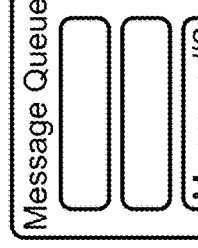

Data is then available to our WebApi.

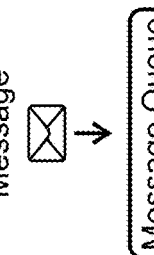
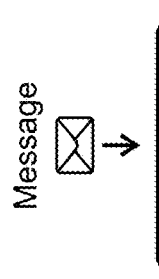
API

UI is updated

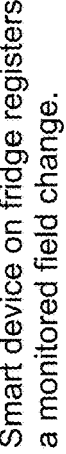

State service that processes any alarms and ensures any needed notifications are sent.

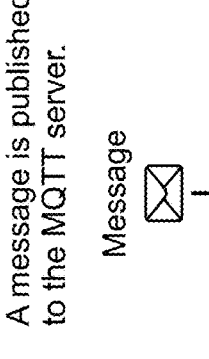

FIG. 5

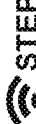 STEP 1

Scan QR Code

Power on unit and scan the QR code located inside the left door of your unit.

 STEP 2

Log in and add new unit

Log in or create an account and select Add unit.

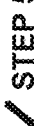 STEP 3

Register your unit

Enter the serial number and last 6 digits of the MAC address on the QR code sticker. Register unit.

STEP 4

Connect your device to unit's Wi-Fi network

Connect your mobile device to your unit's Wi-Fi network; KitchenDash_XXXXXX

*Note: If the unit has been plugged in for more than an hour without setup, it may need to be unplugged and plugged back in to reset the signal.*

STEP 5

Connect unit to your WiFi network

Select Click to open unit configuration and log in with the username and password provided. Enter your building's Wi-Fi network and password, click Save and then Restart.

*Note: You can also find the login credentials in your email inbox.*

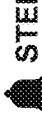 STEP 6

Connect your device back to your building's WiFi

Reconnect your mobile device to your building's Wi-Fi and continue setup.

*Note: Close the newly opened unit configuration browser tab and continue to step 4 of the Add unit wizard.*

STEP 7

Assign a location

Enter a unit name and assign it to a new or existing location. When finished, select Continue.

*Note: Location names are limited to 50 characters*

STEP 8

Set KitchenDash alerts

Enter or select a contact name. To receive notifications enter an email address and phone number. Select Complete.

*Note: Alerts are are enabled by default. To turn off notifications, disable the toggle for text or email. You can add multiple contacts on the dashboard.*

 STEP 9

Your unit was successfully added

Congratulations, you added your new KitchenDash unit! In this step, you'll see your unit details. When you're ready, select View dashboard.

*Note: It can take up to 5 min for your unit to show online in dashboard.*

FIG. 9

Alarm Codes

| SYMBOL | NOTIFICATION | DESCRIPTION | SOLUTION |
|---|---|---|---|
| | Temperature Setpoint | Changing the setpoint can only be done from the physical unit's control panel. | If it was changed by accident, it can be reset on the unit's controller. Refer to the user manual for instructions. |
| HI | High Temp Alarm | Probe is reading above high temperature setpoint | Evaporator coil is frozen and needs defrosted. Refer to user manual for instructions. (High humidity environments can cause this).

Ensure evaporator fan is operational when unit is on.

High traffic in and out of unit impacts cooling performance.

Air vents are blocked. If the refrigerator can't breathe excess heat will build up.

Condenser coil is clogged/dirty. Vacuum/Clean coil regularly.

Ensure condenser fan is operational when unit is on.

Unit is overloaded. Airflow inside of unit is blocked by placing product too close to back wall or together on shelving.

Hot product was placed in refrigerator.

Low refrigerant/compressor issue |

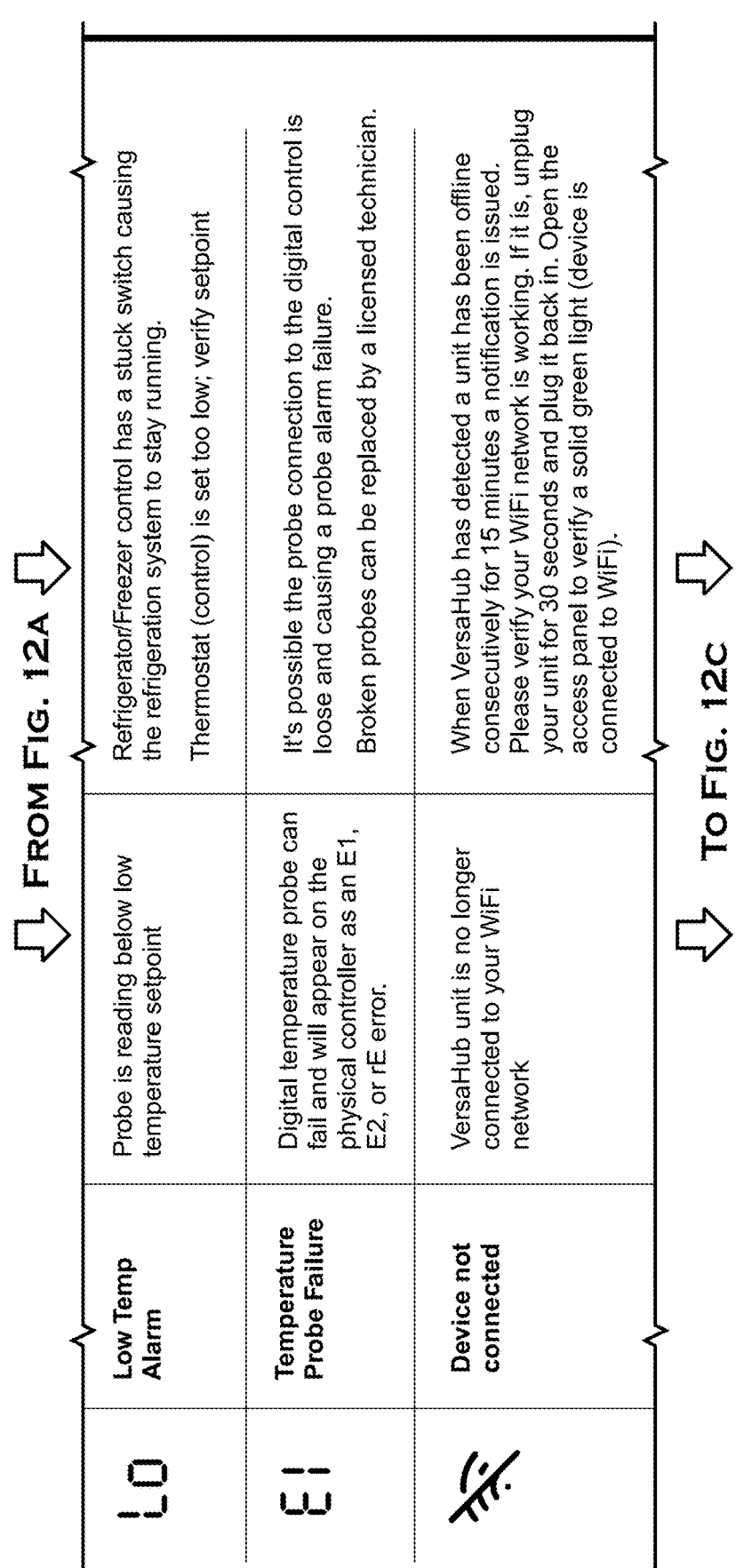

FROM FIG. 12A

TO FIG. 12C

| LO | Low Temp Alarm | Probe is reading below low temperature setpoint | Refrigerator/Freezer control has a stuck switch causing the refrigeration system to stay running.<br><br>Thermostat (control) is set too low; verify setpoint |
| E1 | Temperature Probe Failure | Digital temperature probe can fail and will appear on the physical controller as an E1, E2, or rE error. | It's possible the probe connection to the digital control is loose and causing a probe alarm failure.<br><br>Broken probes can be replaced by a licensed technician. |
| 📶 | Device not connected | VersaHub unit is no longer connected to your WiFi network | When VersaHub has detected a unit has been offline consecutively for 15 minutes a notification is issued. Please verify your WiFi network is working. If it is, unplug your unit for 30 seconds and plug it back in. Open the access panel to verify a solid green light (device is connected to WiFi). |

FIG. 12B

⇩ FROM FIG. 12B ⇩

| | | | |
|---|---|---|---|
| ⌐5F | Refrigeration System Failure | Flashing "rsF" error on physical controller, is triggered when the temperature of the unit continues to climb despite the compressor being on. In that event, the unit detects there is a mechanical problem, and will shut down the refrigeration system until the unit has been power cycled. | Door is ajar for extended periods of time.<br><br>Hot food has been placed into unit.<br><br>Alarm triggers as a consequence of an active alarm such as high temperature.<br><br>Evaporator coil is frozen. |
| CHt | Dirty Condenser Alarm | Flashing "CHt" error on physical controller, is triggered when the temperature of the condenser coil is too high. In that event, the unit detects the coil is dirty and will shut down the refrigeration system until the unit has been cleaned and physically power cycled. The system shuts itself down to prevent possible damage. | Dirty condenser coil. Coil should be cleaned every 30 days using Noble Chemical condenser coil cleaner.<br><br>Ambient air temperature surrounding refrigerator is extremely hot. |
| dor | Open Door Alarm | Flashing "dor" error on physical controller, is triggered when the door has been opened for 15 minutes or more. | Close door<br>Consult manual for instructions |

SMART MONITORING SYSTEM

CROSS-REFERENCE TO RELATED APPLICATION

This application claims the benefit of U.S. Provisional Patent Application No. 63/353,761, filed on Jun. 20, 2022.

FIELD OF THE INVENTION

This disclosure relates to smart-business environment. In particular, this disclosure relates to an automated intelligent system to monitor appliances and inventory, and to appliances that track, report, and may initiate a response to a sensed condition, whether autonomously, or with user intervention or approval, additionally, the system sends information on the status of an appliance to a user through a communication protocol, such that a user is able to see current status and receive updates and reports concerning one or more appliances.

BACKGROUND

Operators interact with a number of different electronic devices in a commercial setting on a daily basis. For example, in a commercial kitchen, a person may interact with various appliances and a variety of other electronic devices throughout the day. It is imperative that all of these devices run efficiently or, at a minimum, at a satisfactory level. Therefore, there is a need to have a single source to monitor status and control efficiency. Further, it is imperative to be promptly alerted of any malfunctions or variances from optimal operating parameters or user settings.

In addition, facility operators commonly manually monitor key aspects and components of their facility, including inventory of stock. For example, a restroom custodian constantly has to identify the volume of paper roll products, liquid products, and stock room inventory levels. Even with close attention, human error, or unexpected events often lead to product shortages in inventory or may result in excessive supplies that would need to be stored until used. Therefore, it would be useful to have a system for reliably monitoring and determining product use and updating the current inventory, as well as provide an alert when low product states exist.

Accordingly, there is a need for a smart monitoring system to gather and report information relating to the functionality, installation, maintenance, management, status and repair of appliances, as well provide alerts as to occurrences such as malfunctions, setting variances, inventory status, and user errors.

SUMMARY

Accordingly, a system and process for monitoring an appliance is provided. The smart monitoring system may provide an alert if one or more sensors for an appliance are outside of a threshold value or range of values. The sensor may monitor an inventory of product and initiate a replenishment strategy if the sensor indicates low inventory of product.

In an embodiment of the invention, there may be provided a smart monitoring system having a dashboard system, at least one appliance;

the dashboard system providing a general user interface; and a computer connected to the general user interface and having: a computer readable storage device having a database module for collecting, storing and linking data associated with at least one aspect of at least one appliance, and a central processing unit connected to the general user interface and the computer readable storage device and running a plurality of core modules having: a user display module providing a title display module, an appliance ID module, a current status module, and a historical status module; a user alarm module having an alarm condition module; a user alert module; and a graphic display module;

the at least one appliance having: at least one sensor configured to monitor an aspect of the at least one appliance and provide a series of sensor data comprising a plurality of sequentially sensed values concerning the monitored aspect of the appliance; and a communication module with a processing unit, memory, and a transmission module configured to communicate electronically with the central processing unit of the dashboard system; and the at least one monitored appliance running a data collection module and transmitting the collected data to the dashboard system.

In an embodiment, the smart monitoring system has at least one monitored appliance that is one or more of refrigerators, freezers, cooking equipment, holding equipment, incubator, warming box, dishwashing machines, ice makers, dish washers, ovens, stoves, microwaves. In an embodiment, the smart monitoring system provides a sensor that is at least one of hall effect sensors, reed switches, temperature sensors, humidity sensors, moisture sensors, optical sensors, gyroscopic sensor, accelerometer sensor, and weight sensors.

In an embodiment, the processing unit of the communication module compares the series of sensor data to an expected value range, and the processing unit triggers an alarm condition wherein at least some of the sequentially sensed values of the series of sensor data differs from the expected value range. The alarm condition module may activate a detectable alarm, which may be an audible alarm or warning light. In an embodiment, when there is an alarm condition, the alarm condition module is configured to actuate the user alert module, which may provide an alert to one or more designated users, the alert being in the form of a text, call, or email. The communication module may periodically report sensor data, or logged sensor data to the dashboard system 50.

In an embodiment, the smart monitoring system may provide a maintenance notification module, that can provide a summary of past maintenance, and an alert as to maintenance being due for an appliance. The maintenance notification module may provide a user selectable button to indicate performance of a maintenance action and reset a maintenance interval timer. The communication module may communicate with the dashboard system through the communication module.

In an embodiment, at least one appliance monitored by the smart monitoring system is selected from the group consisting of rolled product dispenser, liquid dispenser, refrigerator, freezer, solid good dispenser, storage unit. In an embodiment, an appliance stores an inventory of product, and the monitored aspect of the at least one appliance is a quantity of the product. The processing unit of the communication module may compare the series of sensor data to an expected value range, and the processing unit may trigger a replenishment if the sensor data differs from the expected value range. The replenishment may be an alert triggered by the dashboard system and directed to one or more designated users, the alert being in the form of a text, call, or email. The replenishment may be a replenishment strategy selected from the group consisting of an automatic reorder, a semi-automatic reorder, a semi-manual reorder. Where the replenishment is an automatic reorder, the smart monitoring system will autonomously execute an order of a product. Where the replenishment is a semi-automatic reorder, the smart monitoring system will generate an order to be placed after a specified duration of time and provide an alert to a designated user in the form of a text, call, or email. Where the replenishment is a semi-manual reorder, the smart monitoring system will generate a pending order, and provide an alert to a designated user in the form of a text, call, or email of the status of the pending order, and the pending order is to become effective only when confirmed by the designated user.

BRIEF DESCRIPTION OF THE DRAWINGS

The invention will now be described by way of example with reference to the accompanying figures of which:

FIG. 3 is an exemplary logic flow for collecting sensor data and transmitting the collected data, according to an embodiment of the invention;

FIG. 5 is an exemplary flow of data within the system, according to an embodiment of the invention;

FIG. 9 provides an exemplary flow diagram showing preparatory steps in order to set up the smart monitoring system, according to an embodiment of the invention;

FIG. 10 depicts a model flowpath of information according to an embodiment of the invention;

FIGS. 11 and 12A, B, and C depict exemplary alert and alarm codes, according to an embodiment of the invention;

DETAILED DESCRIPTION OF THE EMBODIMENTS

The terminology used herein is for the purpose of describing particular embodiments only and is not intended to be limited of the invention. As used herein, the term "and/or" includes any and all combination of the one or more of the associated listed items. As used herein, the singular forms "a", "an", and "the" are intended to include the plural forms as well as the singular forms, unless the context clearly indicates otherwise. It will be further understood the terms "includes" and/or "comprising", when used in this specification, specify the presence of stated features, steps, operations, elements, and/or components, but not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention and is not intended to limit the invention to the specific embodiments illustrated by the figures or description provided. Other systems, methods, features and advantages of the invention will be or will become apparent to one with skill in the art upon examination of the following figures and detailed description.

With reference to the figures herein, various aspects of a smart monitoring system according to an embodiment of the invention, with particular emphasis on the data collection, transmission, and reporting through an end user viewer will be described.

Figure 1:
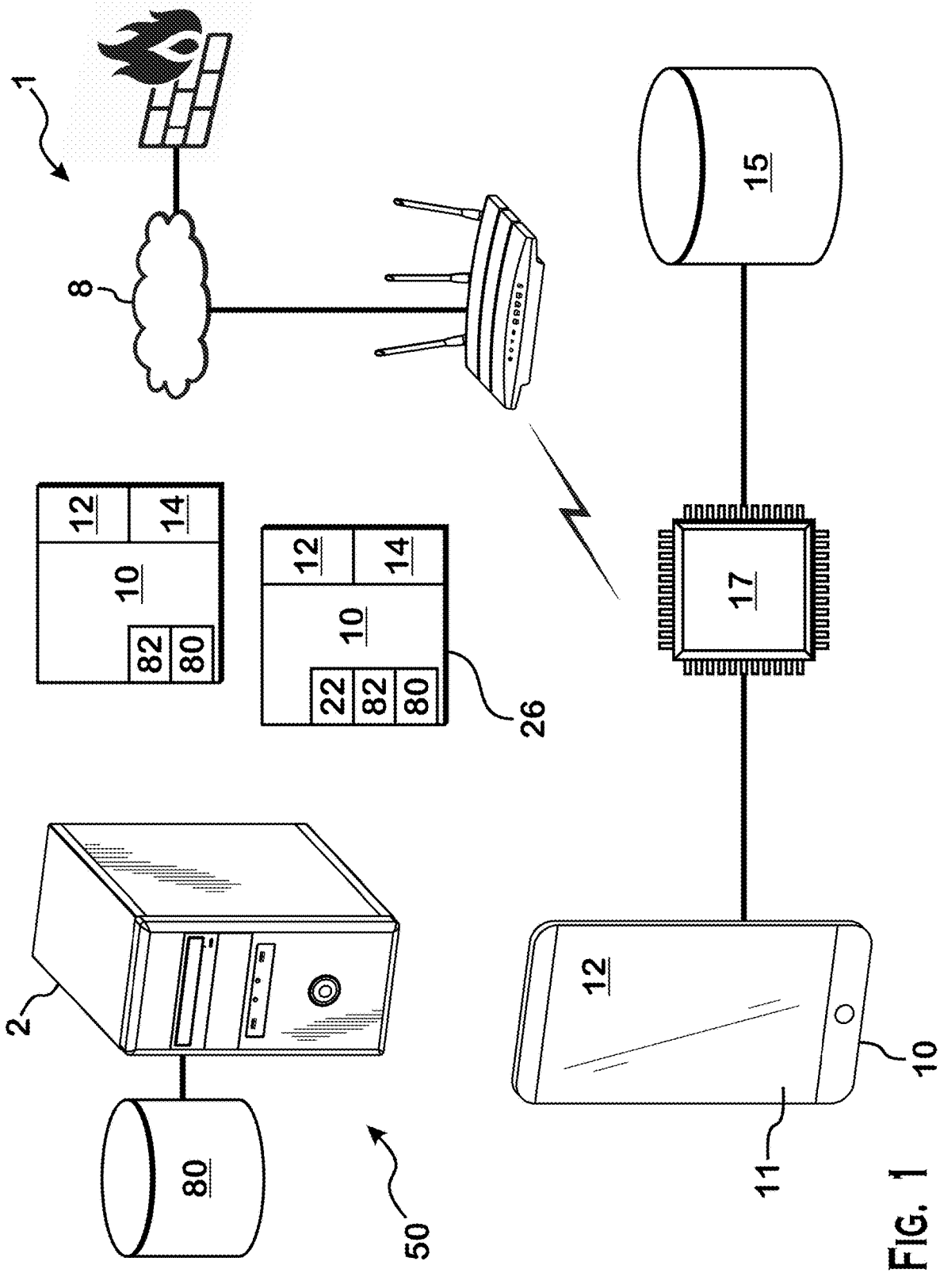
FIG. 1 is exemplary schematic of a hardware infrastructure for a smart monitoring system, according to an embodiment of the invention.

A smart monitoring system 1, which may be a smart commercial monitoring system, according to an exemplary embodiment of the invention, provides for a plurality of hardware components and employs software to facilitate communication between components, as can be seen with reference to FIG. 1 depicting an exemplary schematic of a hardware infrastructure for a smart monitoring system 1. The hardware infrastructure of the smart monitoring system 1 as depicted, in an embodiment includes one or more appliances 10 having sensors 12 and communication module 14. The smart system further provides a dashboard monitoring system 50, and a communication module 14 transferring collected information between the plurality of appliances 10 and the dashboard monitoring system 50. The smart monitoring system may be built using a network router 4 (for instance, a wireless router) and is in electronic communication with other components of the smart monitoring system 1.

Figure 2:
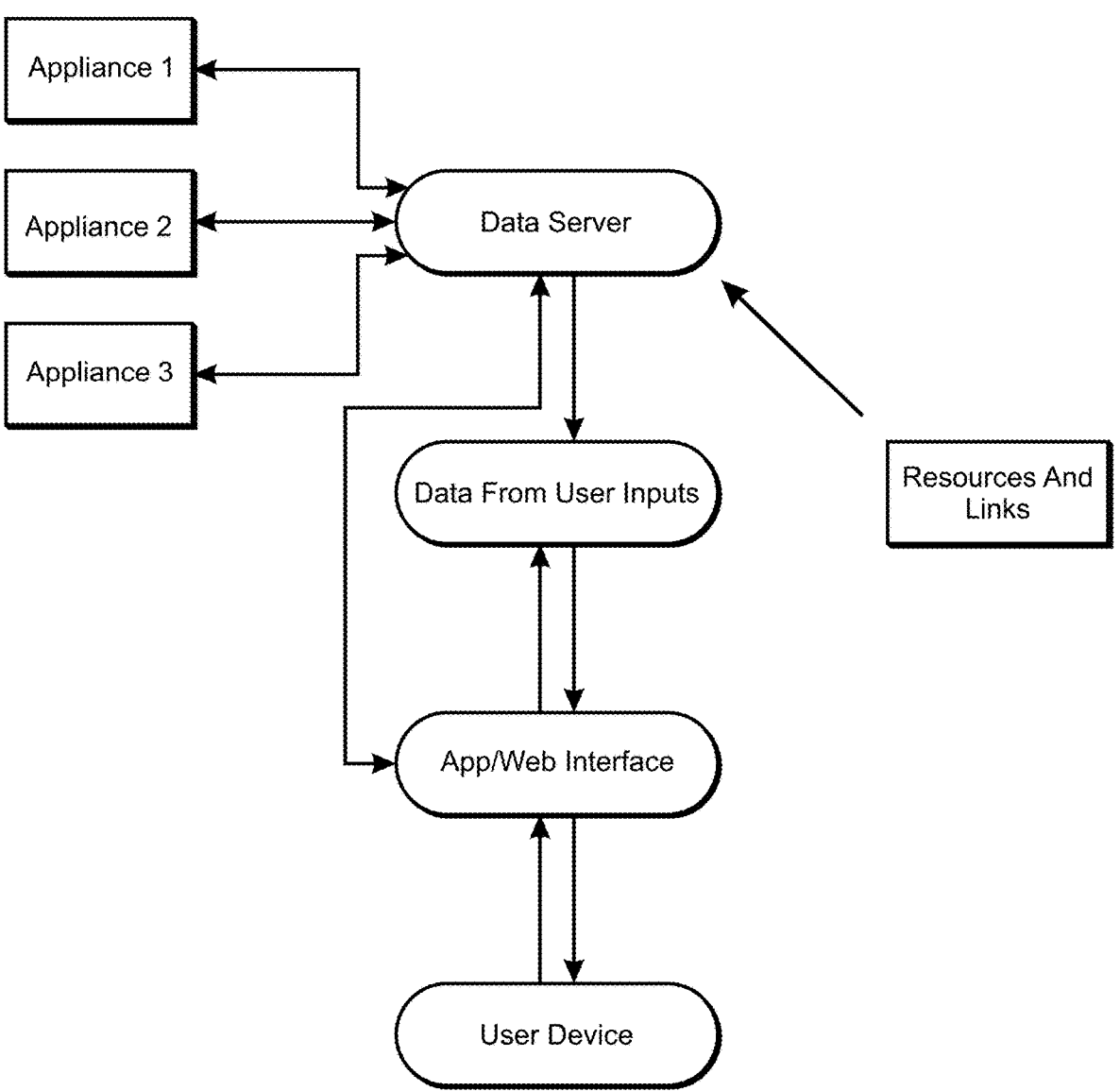
FIG. 2 is an exemplary flow path of inputs and outputs in the practice of an embodiment of the invention.

With reference to FIG. 2, there is depicted an exemplary method of utilizing the system described herein, utilizing inputs provided by the user, and inputs provided by one or more appliances that are being monitored. For example, each of the appliances may provide data concerning a monitored aspect(s). The data server may also receive inputs from external sources, such as resources and links relating to the appliances, including, for example user manuals, or maintenance requirements and parts listings. The system may call for the user to utilize a user device, as will be described, in order to engage with a system provided user interface, which may be, for example through a web application, or a web interface. The data from the user entries, such as settings for each of the appliances, are entered from the user device via the interface, such that the data inputs are provided to the data server. The user-controlled settings may be directed to the appliances, in order to adjust user controllable aspects of each of the appliances, independently, for example, by setting temperature set points, or setting threshold levels for sensed aspects, as will be discussed.

According to an embodiment of the invention, at least one appliance 10 for a smart monitoring system 1 may be any of a variety of devices that can be combined with one or more sensors 12 to monitor a status or condition of the appliance and a communication module 14 configured to record and report the information about the sensed condition(s) of the appliance, such as by sending the sensed information to the dashboard monitoring system 50 via the communication module 14. The communication module 14 is configured to process, gather and store sensor signals as a digital packet and electronically distribute the collected sensor information to other components of the system 1, such as the dashboard system 50, through an electronic communication network, such as may be accomplished by establishing forms of digital communication with a router, that is in communication with the internet or cloud 8, as will be understood by those of skill in the art.

In an embodiment, the appliance 10 may be any typically known appliance, for example, a kitchen appliance such as refrigerators, freezers, ice makers, dish washers, ovens, stoves, microwaves, and other known kitchen devices. It is further contemplated that the appliances 10 according to the invention may include other equipment or devices, such as dispensing devices, e.g., janitorial inventory dispensing appliances, and/or chemical inventory dispensing appliances. Additionally, the appliances suitable for use in a smart monitoring system may include any variety of dispensing appliances that delivers or otherwise provides a consumable product, whether to an employee or other user of such consumable products, including dispensing appliances such as those provided for automated or manual dispensing of paper (e.g., paper towel), napkins, toilet paper. In an embodiment, the appliance may be a dispensing appliance for liquids or solids, such as food items, such as fruit, beer, soup, packages of single serve condiments, and in another embodiment may be a dispensing appliance for chemicals, such as soap, sanitizing liquids, cleaning chemicals, air fresheners. In an embodiment, the appliances 10 may be devices to store and dispense or otherwise provide access to consumable products, including single use, disposable components, such as air filters, water filters, condiments, cutlery, straws, etc.), soap, paper towels, and bathroom tissue.

In an embodiment, each of the one or more appliances 10 provided for use within the smart system 1 may include one or more sensors 12 for monitoring a condition or parameter of the respective appliance 10, with the sensor 12 being capable of having the sensor information logged and/or transmitted by virtue of the sensor being in electronic communication with an appliance processing unit (e.g., CPU) and various controllers. According to an embodiment of the invention, the sensor 12 may be integrated into the appliance 10 during manufacture or be provided as an accessory sensor 12 and communication module 14 that can be added onto or integrated into an existing appliance, thereby allowing a retrofit of the existing appliance for use within the system 1.

Figure 18A:
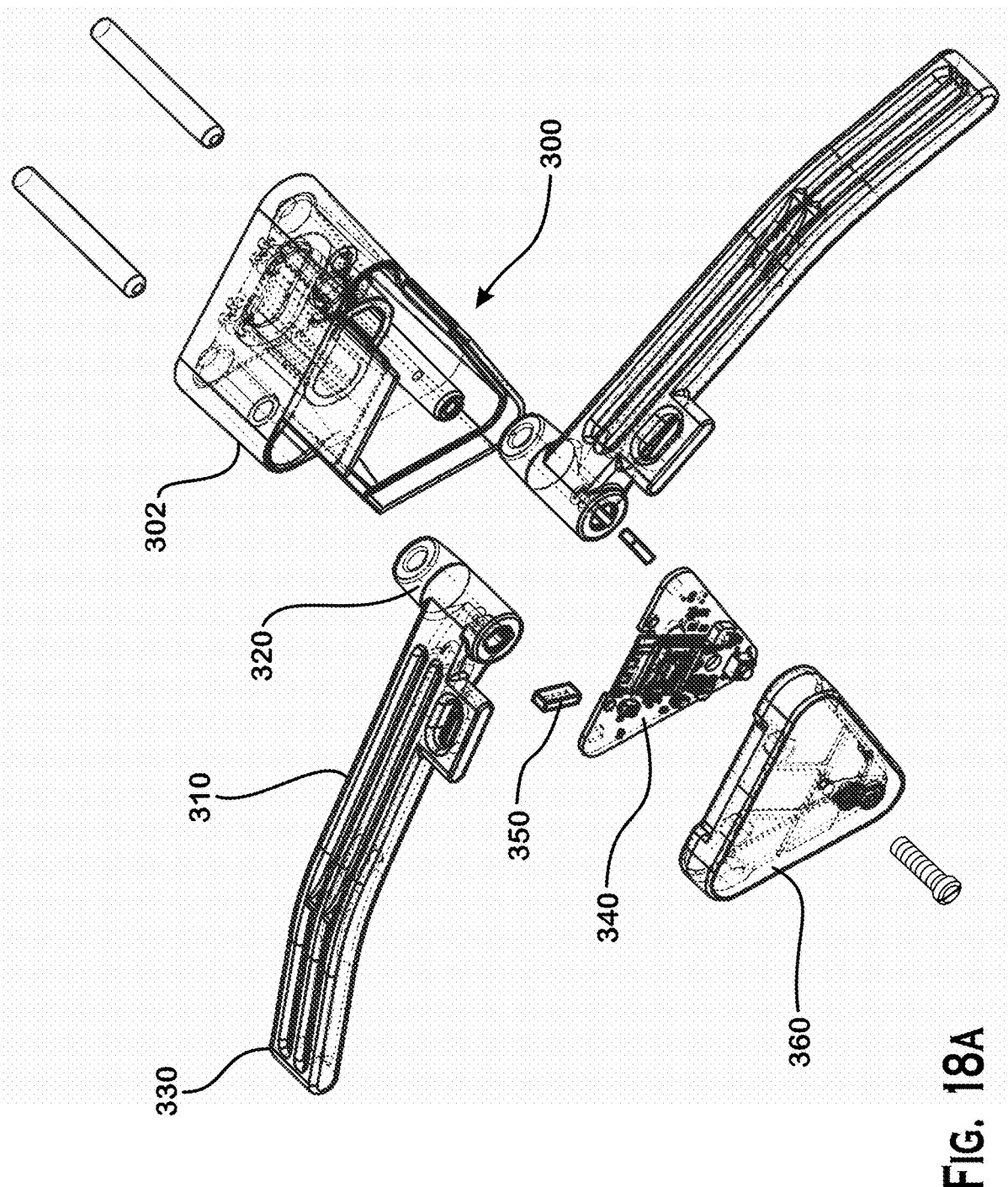
FIGS. 18A and 18B depict an exemplary appliance that is a smart rolled product dispenser that monitors products remaining within the dispenser, according to an embodiment of the invention.

Details of an exemplary appliance can be seen with reference to FIG. 18A, depicting a rolled paper dispenser, but the disclosure may be generally relevant to any nature of appliance for practice of the teachings herein. An exemplary appliance 10 may have one or more sensors 12, such as the depicted hall effect sensors 350 in FIG. 18A, communication module 14, such as may be provided on the circuit board 340 of FIG. 18A, and optionally provide on board power 22, such as is shown in the battery compartment provided in the sensor housing 302 of FIG. 18A. The components may be associated with, integrated with, or fitted into a housing 26 of an appliance, or may be fitted into the sensor housing 302 of FIG. 18A. In the exemplary embodiment of FIG. 18A, the appliance is depicted as a rolled paper dispenser, such as paper toweling, or bathroom tissue. The appliance provides for sensors and mechanism that are configured to allow the appliance to monitor usage of one or more rolls of paper as it is dispensed or deployed. With reference to FIG. 1, each sensor(s) 12 provided for an appliance 10 may electronically communicate, for example, with the appliance processing unit, by sending the sensed information, or information indicative of the sensed information, for recordation as a data log 80 associated with that sensor. Each sensor 12 may be any suitable sensor type, as will be known to those of skill in the art, that could usefully be employed within one or more of the appliances, and/or systems described herein, including, for example, sensors such as, hall effect sensors, reed switches, temperature sensors, humidity sensors, moisture sensors, gyroscope sensors, accelerometer sensors, optical sensors, weight sensors, etc.

In an embodiment, each sensor 12 for the appliance(s) 10 provides a means for producing an output signal, in response to a change in a detected physical phenomena or condition associated with an appliance. As non-limiting examples, one or more sensors 12 associated with an appliance 10 may be provided to sense conditions or phenomena such as a magnetic field, high or low temperature, high or low humidity, changes in light transmission, or light intensity, door open, door closed, dirty coil, presence of liquid, over voltage, under voltage, or lack of electricity or unit failure, such as where the appliance 10 is non-functional.

In an embodiment, the sensor 12 for an appliance 10 detects the change in condition or phenomena associated with the appliance being monitored and further the sensor has, or is associated with, or electronically communicates with a communication module 14. The communication module may be a component for producing an output signal. The output signal may be, as non-limiting examples, a detectable signal that may be produced as a result of the closing or opening of an electrical circuit or outputting a voltage, such as may be called for through the operation of the user alarm module 82, which may be provided as part of the electronics for each specific appliance. The output signal may result in the triggering of a light or sound, or a detectable alarm (or alternatively, triggering an end to an illuminated light or detectable alarm condition). In an embodiment, the sensor output signal may optionally trigger or initiate one or more actions, as will be further described herein, such as the output signal being recorded as an event or stored in a log using, for example a data collection module 80. It is also contemplated that the output signal from one or more sensors 12 within the system 1 may cause the respective appliance 10 to adjust, or be caused to adjust, an aspect of the appliance, or modify the performance of an aspect of the appliance that is associated with that sensor 12.

In an embodiment, the communication module 14 may be an electrical circuit board with a processing unit and memory and a communication pathway (e.g., a network port or wireless connection device to allow Bluetooth and/or Wi-Fi connectivity), such that the communication module is capable of receiving, processing, and sending instructional commands and information, and is able to access the memory, such as RAM for the appliance 10. The communication module, in an embodiment, may save the sensor information in memory, and when caused to do so by the processing unit, may be configured to cause an output signal to be transmitted to another component of the system 1; for example, such as through a wired or wireless network, as will be familiar to those of skill in the art. In an embodiment, an appliance 10 can send the information from the sensor 12, or the output signal, to other components in the system 1, where the sensor or processor for the appliance 10 is in electronic communication with a network node, such as an access point, which can send and/or receive electronic information via the network, to communicate with other components in the system 1. For example, sensor information may be gathered by the appliance processing unit into a log and then transmitted through the communication module 14 (such as a network node) for that appliance. Such transmitted sensor information for a respective appliance 10 may be directed through the network to the dashboard monitoring system 50, configured to receive information from one or more appliances 10 within the system 1. The dashboard monitoring system may provide a processing unit, memory, and storage database, as well as communication module, such that the dashboard system is in electronic communication with other components of the system 1. Additionally, the dashboard monitoring system 50 may further direct the sensor and system information, to a processor for a user's device, such that the sensor information can be received for display on a user display, which may also require sending the display information from the dashboard system 50 via network connection to a processor for a user computing device 11 having a processing unit and memory, as will be known to those of skill in the art, and providing a display screen 12. The user computing device 11 may be in any suitable form as will be understood by those of skill in the art, such as a desktop or laptop computer, a tablet device, or mobile phone. In an embodiment, the communication module 14 is a wireless communication device, such as a wireless access point or node that can electronically communicate with the dashboard monitoring system 50, which is similarly able to access a network.

In an embodiment, the appliance thus provides an onboard microprocessor, which may be associated with an appliance 10 such as may be provided in association with the communication module 14. The onboard microprocessor is configured to record each of the sensors' 12 collected data, for example at set or varying recording intervals. If the data for any monitored sensor 12 is within normal operating parameters defined for that sensor, the recorded data value may be stored in memory or logged to a database. For example, the recorded sensor data value may be stored in the onboard memory (e.g., read and write memory, or random-access memory) accessible by the microprocessor of the appliance 10, as will be familiar to those of skill in the art. This process may be repeated for all connected sensors 12 for each of the appliances 10 within the system 1. The data collected in the memory from each sensor may periodically be compiled and stored in the onboard memory, for example as a data log file, until it is time to transmit the data via a node in communication with the network, such that the sensor data is transmitted to the system dashboard, to be received by the system processor for the system dashboard, or alternatively, recorded to a remote server platform. The microprocessor for each appliance 10 may establish a connection for communication, which may be any suitable form of communication, whether wired, or wireless network, as will be known to those of skill in the art, and thus may transmit the logged data over to the remote server. The interval for transmission back to the remote server may be less frequent than the recording interval, and in this manner may serve to allow the battery life of the sensor(s) for each of the one or more appliances to be maximized. An exemplary logic flow for collecting sensor data and transmitting the collected data can be seen with reference to FIG. 3. Such a logic flow may balance the need to provide sensor information to the dashboard system 50, against the need to preserve battery life for the sensor operations, assuming the appliance relies on battery power for the sensor and or the communication module. Alternatively, where the sensor and communication module are always-on, or powered by mains, the data from the sensor may be constantly updated, such that the dashboard system presents live data values as recorded by the sensor.

Figure 3:
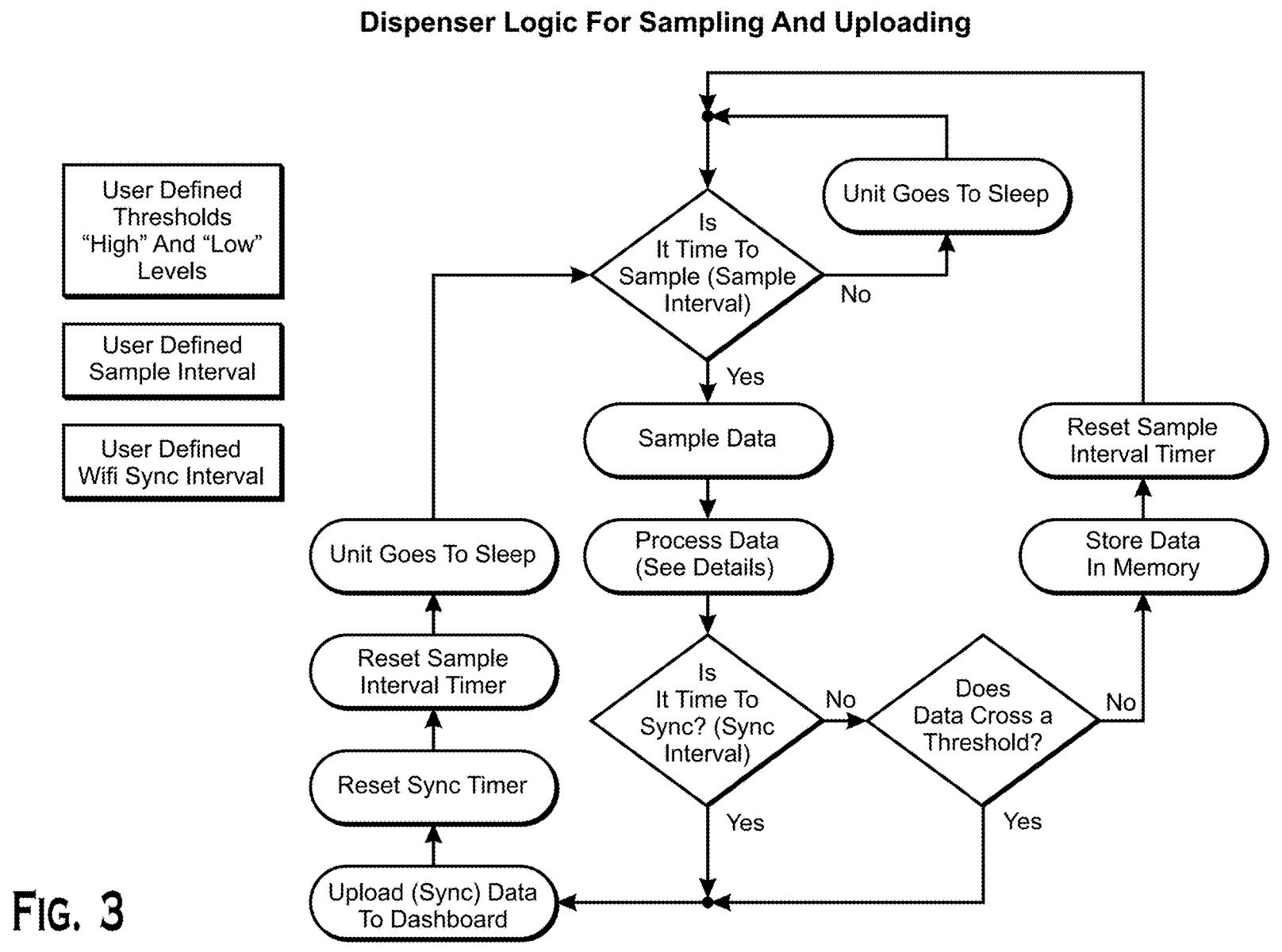

With reference to the logic flow of FIG. 3, an exemplary flow process is depicted, requiring determination of the Sample Interval, which may be provided as a default setting for an appliance 10, or the user may provide a user defined sample interval. Additionally, a Synchronization Interval, determining the length of time between activating the network communication of the appliance 10, in order to allow the transmission of collected sensor data may be set, either as a default interval, or a user defined interval for the synchronization of the appliance 10 with the dashboard system 50. For example, were the appliance 10 communicates within the system 1 using a wireless connection, the interval may be referred to as a Sync Interval. Additionally, the user may provide, or the system 1 may provide, one or more default values that are relevant for the particular sensor being monitored.

With reference to the exemplary logic flow of FIG. 3, as applicable in a scenario where the sensor 12 serves to monitor an inventory of a product units remaining. One skilled in the art will recognize that a similar logic flow may be adapted for other recorded sensor types having a normal or optimal range, and a data range that has crossed a threshold value to fall outside of the normal or optimal value. For the logic flow of FIG. 3, there may be set parameter values for completing the logic flow as shown. For instance, a value for a "Low" level for the amount of inventoried product remaining, and another set value for "Empty" level for the monitored inventory. With these parameter values defined, an exemplary logic flow would look to whether the monitored sensor is due to be sampled, for example by as determined by the time interval since last sampled. If the monitored sensor is not due to be sampled, the unit may return to a low power usage mode, or "sleep" until the next check point. If it is determined that the Sample Interval has passed since the last checkpoint, and the sensor being monitored is due to be sampled, the sensor reading for that appliance is taken and the resulting sensor value is then recorded or treated as the current Sample Data. The Sample Data may be processed to assess appropriate actions, as will be discussed with reference to FIG. 4 below. Continuing with the logic flow of FIG. 3, after processing the Sample Data, an assessment as to whether the appliance is due to synchronize, for example by transmitting the logged Sample Data, is made. If the period of time for the Synchronization Interval has not passed, an assessment of the sensor value, whether in the form of Sample Data or Process Data is made to determine if a threshold value has been crossed that would trigger a status change in the appliance. Where no threshold value is crossed, the Sample Data, and/or the Processed Data value may be stored to memory for the Appliance 10, and the timer for the Sample Interval is reset. However, where the logged data from the sensor, whether as Sample Data, or Processed Data, indicates that the remaining inventory is in the "Low" range, by virtue of the Sample Data, or Processed Data being a sensed value that is equal to, or below that value defined as "Low"; or alternatively, where either the Sample Data or the Processed Data indicates the inventory, as recorded by the sensor, is in the "Empty" range, by virtue of a sensed value being below the "Empty" defined value, then the Appliance is caused to synchronize and send the collected data log stored in memory, if any, and the currently sensed Sample Data and/or Processed Data is transmitted by network to the Dashboard System 50. Concurrent with the synchronization activity, the synchronization timer is reset, and the timer for the Sample Interval is also reset, whereupon the unit may return to a low power usage mode, or "sleep" until the next check point.

In an exemplary logic flow, the sensed data provided from a sensor 12 monitoring an aspect or condition of an appliance 10 will be assessed to determine if the value indicated indicates a corrective action or adjustment should be made to ensure proper operation of the system 1. Such assessment may require processing the data through an algorithm to provide the data in a format or value range that is relevant to the determination of operation of the system, and may for example, determine if the Sample Data value recorded, or as processed into a format that allows evaluation, indicates a value that falls in a range that may require an action, or adjustment in order to optimize continued operation or maintenance of the system 1. In an exemplary embodiment, where an appliance has an optimal range of values, and the sensed or processed data value falls outside of the optimal range, the system may require an action or adjustment to counter the effect of the data value falling outside of the optimal range. In an embodiment, the action or adjustment based on the sensor value or processed value may be initiated autonomously within the system, such as where a processing unit associated with an appliance or other aspect of the system 1 is configured to have a measure of operational control of functions within the system; or alternatively, the action may be to provide an alert or initiate an output signal that may bring attention to the sensed data value and the need to initiate an adjustment or corrective measure, for example, identifying a need to close an appliance door, a need to resupply inventory, or even to initiate an order automatically to resupply the monitored inventory.

Figure 4:
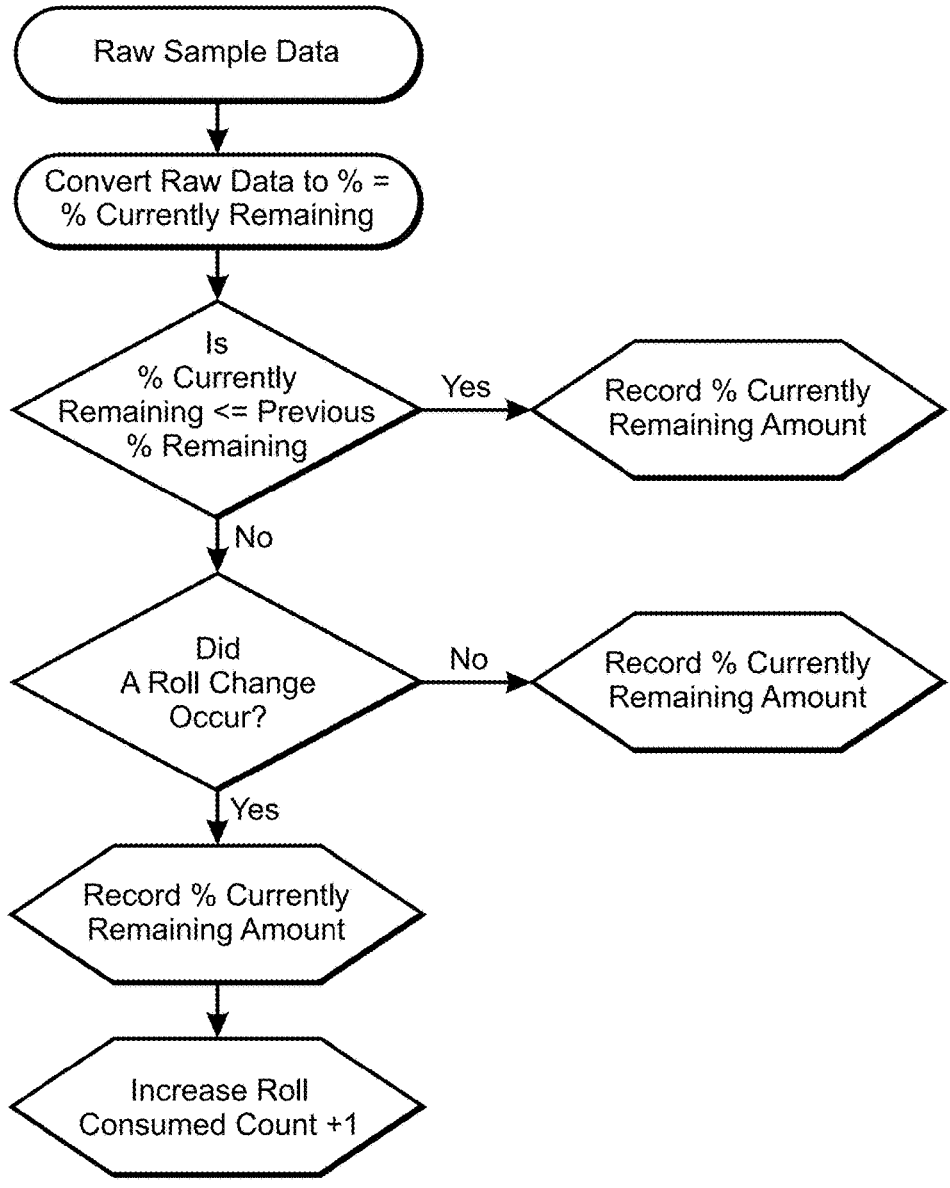
FIG. 4 is an exemplary data processing logic flow for the processing of the Sample Data, according to an embodiment of the invention.

An exemplary data processing logic flow is provided in FIG. 4. As shown, an exemplary data processing logic flow for the processing of the Sample Data (as described above with reference to FIG. 3) is depicted. As with the logic flow of FIG. 3, the data processing logic flow of FIG. 4 will be described with reference to an appliance 10 that provides a sensor 12 to monitor an inventory of product units. One skilled in the art will recognize that a similar data processing logic flow may be adapted for other recorded sensor types having an optimal range, and a data range that has crossed a threshold value to fall outside of a range of values determined as being optimal. The threshold value may be a user-set parameter, or a default setting for the appliance 10. As shown in FIG. 4, the data processing logic flow is initiated with the receipt of the Sample Data (from FIG. 3) as collected by the sensor 12 of an appliance 10, and then may be processed by the system, typically by a processing unit associated with the appliance 10 being monitored by the sensor providing the Sample Data, though it is recognized that the Sample Data may be provided electronically to another component of the system for processing as described herein.

The Sample Data may be converted into a format that allows an evaluation of the condition or aspect of the appliance 10 being monitored. For example, where the appliance is of a type that provides for an inventory of product, the processing may be performed to convert the Sample Data concerning the monitored inventory of product, as the raw data instantly recorded, into a more universally applicable standard. In an exemplary embodiment, the application of data processing may be where the Processed Data may be the percentage of inventory currently remaining in the appliance, as will be familiar to those of skill in the art. Such a conversion may require the determination of threshold inventory levels that establish the "no inventory" condition of 0%, and the "full inventory" condition of 100%. Alternatively, threshold values may be assigned in the context of "low inventory" condition being assigned a value of 0%, and "optimal value of inventory" condition being assigned a value of 100%. One skilled in the art will recognize that user or application specific selections may be applied without deviating from the spirit of the teachings of the application.

In an embodiment, the Processed Data value, for example, when converted to a percentage of inventory currently remaining may be compared to defined thresholds or determined values, for example, comparing to historical logged data values, such as, the previously recorded processed data value, data values earlier recorded over a defined time period, or averages of historical data values. These comparisons may provide an indication of the instantaneous trend, or long-term trend, as applicable.

As depicted in FIG. 4, if the current Processed Data value, when compared to the previously recorded Processed Data value, and is found to be less than or equal to the previously recorded Processed Data value, then the current Processed Data value may be recorded in a log for the appliance. Such a log may be preserved in memory accessible by the processing unit associated with the sensor being monitored, or other memory storage component within the system 1.

In an embodiment, the current Processed Data value may be compared to alternative historical Processed Data values, and if comparison conditions are met, the current Processed Data value may be similarly logged. For example, the current Processed Data value, if after comparison to historical value(s), may be recorded to a log as previously described if the defined conditions are met.

In an embodiment, a condition may be met when the current Processed Data value is compared to a previously recorded Processed Data value, and is found to differ in excess of a threshold amount when compared to previous values, and/or the current value meets a current threshold amount, then the comparison may be deemed to meet a defined set of conditions and the current Processed Data value may then be logged as previously described.

In another embodiment, the current Processed Data value may be treated as a set with a grouping of recent Processed Data values, and compared to a historical set of previously sensed Processed Data values, then when the recent set and the historical set are compared to each other, whether in terms of absolute values, or in averaged form, an assessment of the condition may be performed to determine if the value should be logged by recordation within the memory of the system.

Exemplary condition sets can be seen with reference to FIG. 4. It is contemplated that any of the condition sets may be independently considered, or successively considered, in the logic flow path as depicted. In an embodiment, the condition sets for consideration may include, for example, where the current Processed Data value was found to be less than the previous Processed Data value then the current Processed Data value may be recorded to a log as described. In an embodiment, the condition sets for consideration may include, for example, where the current Processed Data value was found to not be less than the previous Processed Data value, and a determination is made as to whether the inventory was refreshed with a resupply, for example, by replacing a used paper roll with a new paper roll. If after such analysis, a determination is made that a resupply was not made (e.g., replacing a paper roll did not occur), then the current Processed Data value may be recorded to a log as described. Alternatively, if after such analysis, a determination is made that a resupply was made (e.g., replacing a paper roll did occur), then the current Processed Data value may be recorded to a log as described, and further an inventory count for product consumed or deployed to the appliance may be increased accordingly.

After such comparisons, depending on the outcomes of the conditions evaluated, the logic flow may call for an adjustment in response to the measured condition. For example, if, after the evaluation of the processed data value, against the historical data values, and analyzing all the relevant conditions, it is determined that adjustment is necessary, then the outcome may be to perform any required action to bring the sensed value towards the optimal range. Such as where the indication is that the inventory is low, or approaching a lower than optimal value, then the outcome of the conditional analysis maybe an adjustment to increase the inventory count of the appliance. In this manner, the analysis may provide a feedback loop where the analysis results in an outcome adjustment or action, such as an increase in the appliance inventory, as a result of the assessment of conditions. Such an increase in the inventory count may be through an automatic replenishment system, as will be described, or alternatively may be an alert provided to the user through the dashboard system to initiate a replenishment of the inventory.

If it is the case that for any of the monitored sensors of the appliances, the data value recorded falls outside of expected or normal operating parameters set for that sensor, then the microprocessor associated with the appliance having the out of range sensor value, may, based on user definable settings, be caused to immediately transmit the data back to the remote server, and initiate an alert notification of the issue to the operator.

Exemplary embodiments of appliances that may be incorporated into the smart monitoring system will be discussed below.

According to an embodiment of the invention, a dashboard monitoring system 50 generally includes a user display system accessing a network router (for instance, a wireless router) and connected to a database server and a web server, while also utilizing known hardware components, including a firewall, a network, and a computing device. The display system allows a user to access to a plurality of images, in the form of graphical data, such as information and images, through a computing device and a network traffic information on the database server (i.e., SQLServer or WindowsServer2012 or newer) that connects to a web server. The web server functions as a way for network router to communicate to the database server through an application-programming interface (API) between the computing device and the database server. A firewall may be integrated for security purposes such as, but is not limited to, blocking unauthorized access to the web server and permitting unauthorized communication thereto. The display system is designed to run through the computing device through the data files that are downloaded over personal area networks (PANs), local area networks (LANs), campus area networks (CANs), wide area networks (WANs), metropolitan area networks (MANs) and any new networking system developed in the future. These networks are represented with the network. One skilled in the art should appreciate that the display system can be maintained solely through the computing device, as the data files can be pre-loaded to the computing device. In an exemplary embodiment, a user connects to the network router using the computing device through the network.

In exemplary embodiment of the invention, a computing device generally includes a general user interface with a display area, a memory device, and a processor. In an exemplary embodiment, the computing device is a tablet computer with a touchscreen display to access and display a web-based dashboard. The computing device includes sensors, including an audio output device and an audio input device. The audio output device may be a speaker or an audio jack, while the audio input device may be an internal microphone. The touchscreen display uses finger or stylus gestures to navigate the general user interface. However, one skilled in the art should appreciate that other implements could be used, including a computer mouse, a keyboard, or joystick. In fact, one skilled in the art should appreciate that the computing device is a physical computer and could be, but not limited to, a desktop computer, a laptop computer, or a cell phone to access a web-based dashboard. The memory device is a storage device having computer components and recording media used to retain digital data. The processor is a central processing unit (CPU) that manipulates data stored in the memory device by performing computations.

In an embodiment of exemplary operation, the system 1 employs an exemplary flow of data within the system in the manner depicted in FIG. 5, and with reference to the schematic of FIG. 1, where the appliance 10 has a sensor 12 that monitors any detectable and/or measurable aspect of an appliance. The sensor information may be logged or recorded to onboard memory, for example, in a data collection module 80, capable of logging values provided by the sensor 12 for the monitored appliance 10. In an embodiment, the data collection module may be a server in communication with the appliance or the dashboard system. The communication module 14, having an onboard microprocessor, then compiles a packet of sensed information data, such that the packet of information, including at least identifying information for the appliance, time signature for the collected information, as well as the raw data values received by the sensor and stored to memory. The packet of information may be published, e.g., sent electronically to the dashboard system 50 as a message from the appliance 10 to the dashboard system 50. The dashboard system 50, which may be a remotely located system away from the immediate location of the appliances, will receive the published packet of information using known electronic communication techniques, such as any suitable communication language and protocol as will be understood by those of skill in the art, including those utilized for internet communication. In an embodiment, the dashboard system utilizes a database accessible through the network, such as a web server, and may be accessible in the cloud, as a remotely accessed database server. The data from the appliance, and any other accessible appliance for which the user has access, may be accessed through an application programming interface (API). Additionally, information from the published packet may be accessed by the dashboard system, and evaluated, and optionally, the dashboard system 50 may generate any alarms using a user alarm module, or provide notifications using a user alert module, as determined by the software associated with the dashboard system 50, as discussed herein. The user device 11 may access the information through the network connection to retrieve and visualize the data that is accessible through the API. The user device 11 may provide a graphical user interface that displays the relevant information from the dashboard system, including the sensor data from one or more appliances 10 within the system 1. Additionally, the user device 11 may receive notifications and alerts generated by the dashboard system 50 and/or the appliance 10.

In an embodiment, data that is received from the sensor(s) 12 for each appliance 10 within the system 1, once sent to the dashboard system 50, may be electronically stored, for example in rewritable digital memory of the remote server, and may be directed to a cloud-based storage server. The data is processed through the system, and the user can view the current status of their equipment, as well as historical data on the performance of their equipment. If there is an alarm, the user may be immediately notified through the dashboard system 50, and through a communication directed to the user through a designated contact point, for example, by directing a text alert, an email alert, or a phone call alert to make the user aware of the potential issue. The data may be retained by the dashboard system 50 for a set period, as appropriate for the user. In an embodiment, the data may be retained for approximately one year, though one skilled in the art will understand that more or less duration of stored memory may be appropriate. In an embodiment, the dashboard system 50 may provide different levels of user subscription, and based on the user subscription level, the user can retrieve this historical data which may be retained for different periods of time, based on the user's subscription level. It is contemplated that such historical data may be made available to the user in the form of consolidated reports, that may be retrieved with the dashboard system and caused to be displayed on the user interface of the system 1. It is further contemplated that the dashboard system 50 may periodically generate performance reports that can be requested on an as needed basis by the user, or automatically provided to the user, with the reports displaying one or both of the collected data for any one or more of the sensors and may be optionally depicted in graphic or tabular formats. The interaction and communications between the graphical user interface and the display visible to the user (the front end) and the interactions with the database and/or web server of the dashboard system, or other information as needed for preparing the user display screen (the back end) for the interactions with the dashboard system, as described herein, are depicted in the exemplary screen images, as can be seen with reference to the following figures. Such reports may be sent by email, or retrieved through the user interface, or optionally provided through a hyperlink to direct the user to a website with the performance information.

According to the invention, a communication module may be a communication module 14 associated with the appliance being monitored and provides a wireless system that connects the plurality of appliances to the dashboard system 50. However, one skilled in the art should realize that wired local area network (LAN) connections could be used as well. In an exemplary embodiment, the communication module utilizes a known home or business internet service system, which generally includes a broadband modem, a wireless router and internet connection thereto.

Figure 6:
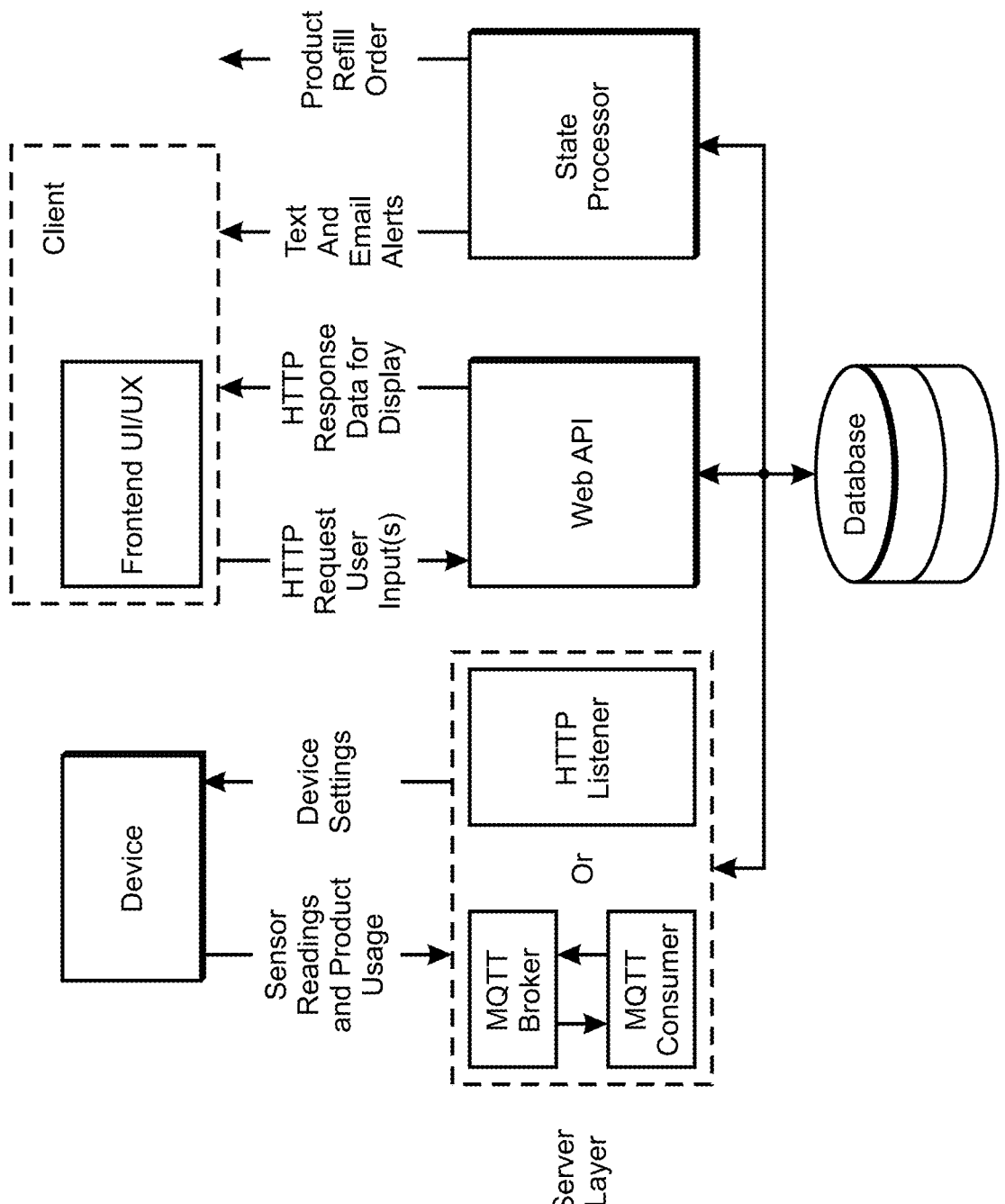
FIG. 6 illustrates an exemplary embodiment of the front end and back end framework of the smart monitoring system, according to an embodiment of the invention.

In the shown embodiment of the smart monitoring system 1, the user may connect to the network router using a computing device, such as a mobile phone or computer 10 and receive updated information from the smart dashboard 50 through the network connection. FIG. 6 illustrates an exemplary embodiment of the front end and back end framework of the smart monitoring system 1. The front end including the user device(s) that interact with the dashboard system 50, as well as the appliances 10 or devices being monitored. The back end provides one or more database or web server accessible databases. Each of the front end components and back end components are in communication with the server layer, that can receive and send information to the front end, as well as to the back end, as shown in FIG. 6. The appliances through the communication module communicate with the network to engage with the server layer, such as where the appliances provide sensor readings and information on inventory and/or product usage to the server layer, which may be in any suitable form, including through a machine to machine network protocol, such as a bidirectional communication protocol used for message queuing (e.g., message queuing telemetry transport—MQTT, utilizing a MQTT Broker and MQTT Consumer), as will be known to those of skill in the art. The MQTT Broker sends and receives information to and from the MQTT Consumer which is itself able to send and receive information from the database or web server database of the back end. An alternative route of communication between the front end device(s) to reach the database is through an HTTP monitoring socket or HTTP Listener, which can send and receive information from the database server in the back end.

Additionally, the user device of the front end, may allow user interaction with the system through a user interface, and can send user inputs, in any suitable communication protocol, such as in the form of HTTP requests, to interact with the Web API in the server layer. Additionally, the Web API can provide information to the user device, e.g., the user interface, by any suitable communication protocol, such as HTTP Response, thereby providing data that can be directed to the display visible by the user. As will be known to those of skill in the art, a web API will access a database for two-way communication, sending and receiving information that can be processed by the dashboard system, and access information from the back end database and/or database server, such that the Web API can prepare, process and provide the information to the user display.

Additionally, information from the database and/or database server may be exchanged with a State Processor, as is known in the art, which may be provided as part of a Web API, or independent thereof. The State Processor may direct various communications to the user device, or provide other forms of notice or output actions, as directed by the dashboard system 50. The State Processor may provide text and/or email alerts to the user's device, or may generate an automated voice message that can be delivered by automatically calling a designated phone number set within the system 1. Additionally, the State Processor may initiate an response action in reaction to a sensed condition or aspect of an appliance 10, such as by initiating a product refill order, according to any of the replenishment strategies discussed herein.

Figures 7, 8:
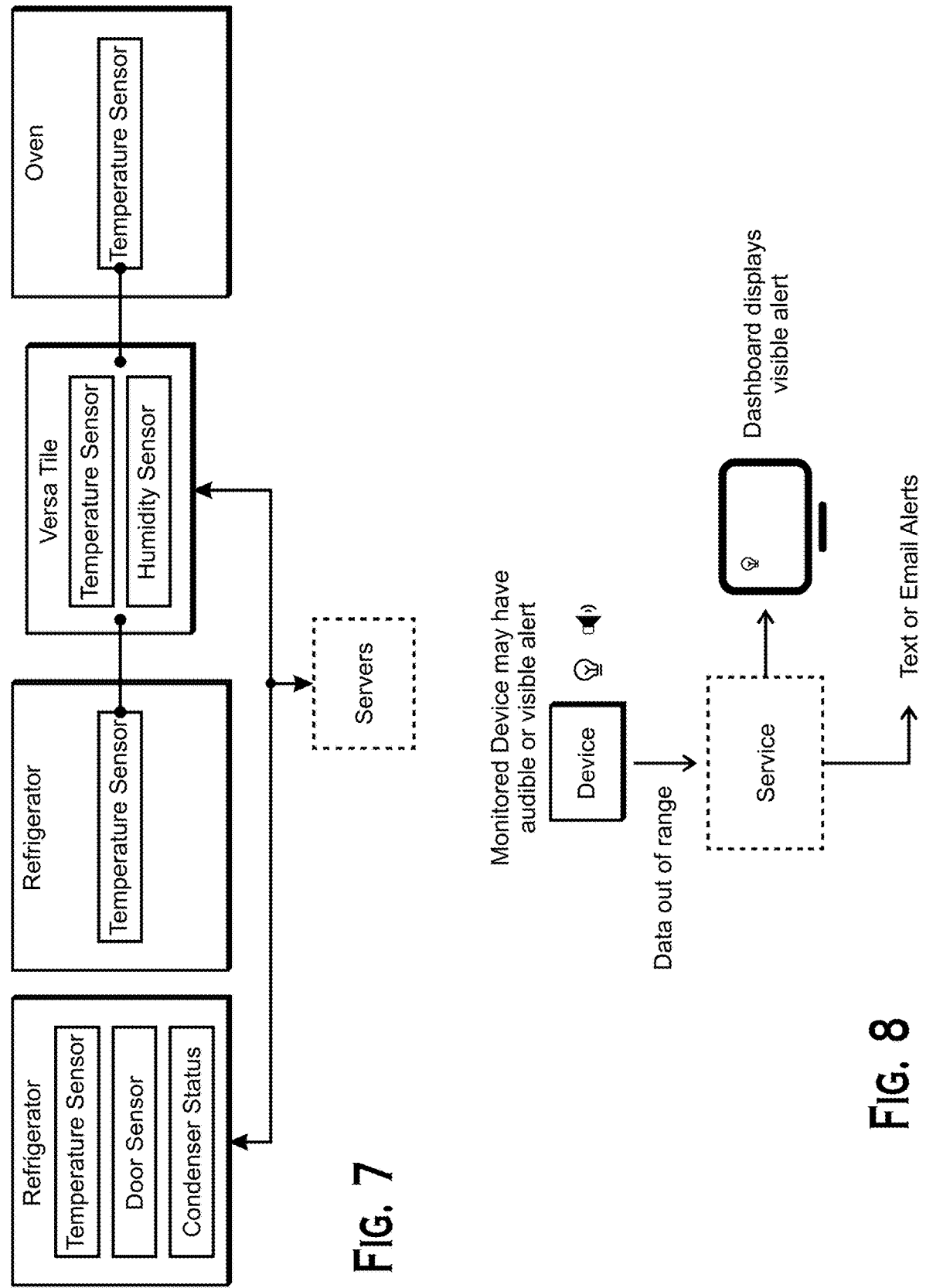
FIGS. 7 and 8 provide exemplary architecture and protocol for the smart monitoring system, according to an embodiment of the invention.

FIGS. 7 and 8 also provide exemplary architecture and protocol for the smart monitoring system 1. Though one skilled in the art would appreciate that other hardware and protocol designs are possible as long as such modifications would not divert from the spirit of the invention.

As shown in FIG. 7, in an exemplary architecture of the smart monitoring system, servers, such as the back end database servers communicate with, and receive information from at least one, or often, a plurality of sensors. Each sensor monitors an aspect or condition of an appliance that a sensor is associated with. As depicted, exemplary appliances that can be monitored include a first and second refrigerator, and an oven. In an exemplary embodiment, the first refrigerator may be provided having multiple sensors, such as a temperature sensor, door sensor, and a sensor to monitor the condenser status. The first refrigerator may have onboard electronics, such as a communication module, as part of the appliance that allows the first refrigerator to communicate with components of the system independently, as taught herein. In another exemplary embodiment, the appliance is the second refrigerator as shown, and may be provided with only a temperature sensor. In another exemplary embodiment, the appliance is an oven, also having a temperature sensor. Unlike the first refrigerator depicted however, the second refrigerator and the oven are in communication with an add-on detector appliance, such as a device that detects the humidity in the kitchen, and is also configured to receive, processes and communicate all of the sensor data received by the add-on appliance, including sensor data from each of the second refrigerator and oven, in addition to any onboard sensor of the add-on appliance. As with the first refrigerator, the add-on appliance may communicate and receive information from the servers, as previously described. One skilled in the art will recognize that alternative sensor types may be substituted or additionally provided for the example appliances, such as line voltage detectors, humidity sensors, etc. One skilled in the art will recognize that alternative appliances or detector devices may be substituted or additionally provided for use within the system 1, including, but not limited to, appliance types such as freezers, smart shelves, smart containers, microwaves, dishwashers, icemakers, etc. One skilled in the art will recognize that the teachings herein may be applied with any nature of appliance or device that has at least one aspect or condition that can be monitored by a sensor and may utilize integrated or add on electronic communications to be deployed within the system 1.

FIG. 8 depicts a model protocol for providing an alert condition or alarm condition through the system. In an exemplary embodiment, the device having a monitored condition or aspect may sense a data result that is out of a defined range. In such an instance the communication module may initiate an alarm condition, such as triggering the lighting of a warning light or an alert chime or warning noise. It is contemplated that different devices may provide distinct alarm types, depending on the nature of the sensed condition, which may further be customized for the particular device or appliance being sensed. Additionally, as taught herein, the data out of range occurrence will further be provided to the system or service, such as being directed to the dashboard system 50. The dashboard system may initiate an alert message or signal to be sent to designated users, which may be in the form of text or email alerts, or alternatively the user interface of the user display may indicate the existence of the alert condition. The system may provide instruction for addressing or responding to the alert condition.

In an embodiment, an appliance is associated with or controlled by a single user, which is authenticated with the registration of the device. It is contemplated that additional users may be able to receive information and manage device settings, after being authenticated in any suitable manner, as will be familiar to those of ordinary skill in the art.

In an exemplary embodiment of a mode of operation of the system 1, a sensor 12 associated with the system, or with an appliance 10 of the system may detect a condition or physical phenomena, and result in an output signal, which may be initiated or triggered, or produced by the sensor. The output signal associated with that sensor 12 may be sensed locally, such as by a processing unit or alternatively a computer, associated with at least one of the appliances 10 for transmission to a remote processor associated with the dashboard system 50, as described herein. Such an output signal may additionally trigger a local alarm or indicator, such as an audible alarm, or an indicator light. The output signal from the sensor may be directed to, and/or received by a processor of an appliance, or a processor associated with multiple appliances, for example, within a room, or room section, and in turn, may be transmitted by communication module to a remote processor, which may be associated with a remote server. The remote server may be a web server, or network server, and may be configured within the dashboard system 50 to monitor the performance of one or more appliances 10, at one or more locations, processing the aggregate signal information for each of the appliances 10 being monitored. The remote server may receive updated information from the various sensors associated with various appliances, or alternatively, the remote server may be capable of communicating with the processor associated with each of the appliances being monitored by that remote server, and periodically retrieve the appliance status information for the monitored appliances. It is contemplated that the remote server may preserve a log of the performance of the monitored appliances. The extent of the information stored may be any period of time determined as suitable and is limited by rewritable memory for that server. Alternatively, the information may be received by the remote server, and stored directly on digital media. It is contemplated that the remote server may be capable of logging the performance of the monitored servers for at least one hour, at least 12 hours, at least one day, at least one week, at least one month, or may provide for an updated log that preserves the information in digital media on an ongoing basis, and my periodically be directed to an archival storage media, such as a cloud database server, and the cache of rewritable storage media for the remote server selectively or automatically cleared.

In an embodiment, the remote server is a web-based server, utilizing a web-based user interface, through which the user, using a user computing device with a digital display and onboard processor, may electronically communicate with the remote server in order to access the stored information for each of the monitored appliances. The stored information may include appliance identifying information, and the performance or condition data associated with that appliance. Furthermore, the stored information may also identify if a sensor has triggered an alarm condition. For example, an alarm condition may be triggered where a returned signal value, or plurality of signal values deviate from a defined range of acceptable sensor output signal values. It is contemplated that the system may provide default range of acceptable values from the sensor(s) for each of the appliances being monitored. It is also contemplated that the system may allow user customization, or system adaptation, through the graphical user interface of a user display 11 in order to determine the range of acceptable signal values for each of the sensors 12 associated with the monitored appliances 14.

The alarm condition for a sensor 12 would be triggered in the event that the sensor returns a value that is outside of the range defined as being acceptable. It is contemplated that a threshold period of time may additionally be required before triggering the alarm condition. For example, it is anticipated that the door to a refrigerator would periodically be opened or closed, which condition may be monitored by a sensor for the refrigerator. Such values associated with the door open, or the door closed would be expected in the normal course of events and would not trigger the alarm condition, unless the duration of time during which the door open condition is sensed.

Alternatively, the signal from one sensor 12 may be compared to the data of another sensor 12, and in that manner the system 1 may determine if an alarm condition should be triggered. For example, returning to the example of an appliance 10 that is a refrigerator, the door open may be a normal condition, unless the sensor for the temperature inside the refrigerator should concurrently determine that the temperature is outside of an optimal or desired range, in this instance the alarm condition for that appliance may be triggered where the door is indicated as being open and concurrently the detected temperature of the appliance is determined to be elevated above the desired set point range. One skilled in the art will recognize that one or more sensors may be monitored to determine when an alarm condition should be triggered.

In an instance where the alarm condition is triggered for an appliance 10, the remote server of the system may store the sensor value information in a digital media, for instance the digital performance log, and further may initiate an alarm alert, in which the remote server will automatically send a message to a set of defined users. The alarm alert that is to be sent may be any suitable form to allow rapid notification to a set of users, including a system generated email, text, or phone call. For instance, is a refrigerator senses an alarm condition (logic built into digital temperature controller), a message is broadcast to dashboard to display the alarm and send an email and/or text alert to the user or contact information provided by the owner of the dashboard account.

The content of the alert may be a default alert but may further be capable of being customized by the users of the system. As an exemplary alert, the content may include the date and time, the specific appliance and or location information of the appliance in the alarm condition; the identification of the sensor(s) responsible for identifying the alarm condition, and the values detected for each sensor that triggered the alarm condition. It is further contemplated that all sensor values for the appliance in the alarm condition may be provided, along with an optional explanation, which may include details on the normally expected. Where the message is in a configuration that is acceptable for detailed display information, such as an email, or a text message with a hyperlink to a website, the detailed information that can be reviewed by the user may include a data table or a graphical representation of the data values over time, such as a graph indicating the sensor readings over the previous relevant time frame (e.g. 1 hour, 1 day, 1 week, etc.) It is contemplated that data from multiple sensors 12 may similarly be provided for review by the user. It is contemplated that scale or time displayed on the graph may be user defined or adjusted by the user directly on the display of the computing device. Additionally, it is contemplated that a list of alarm condition events may be provided to the user from the logged alarm events or recorded data values, including description of the sensor alarm, location of the appliance, type of appliance, time of occurrence, duration of alarm condition, and extent of deviation outside of the normal range of values. Possible alarm conditions include but are not limited to high or low temperature warnings, open door, closed door, dirty coil, or unit failure. For example, where a refrigerator door fails to close, and the nominal range of acceptable values is between 34 and 37 degrees, the event log provided in an alert to the user(s) may allow the determination if the refrigerator temperature exceeded the high set point by one or both of temperature reading, and for a duration of time that would render the contents of the refrigerator unusable and should be discarded for safety. Conversely, the event log provided may allow determination of whether the contents are salvageable, for example where the temperature only exceeded the alarm triggering value minimally, and/or for a brief duration, and thus the contents of the refrigerator may not need to be discarded. If this detailed information was not recorded, it may be the case that an assumption is made that the contents must be spoiled and should automatically be discarded.

It is further contemplated that the output signal from the sensor may additionally, or alternatively, trigger a mechanical event or condition that may be capable of being observed or detected by person in the vicinity of the appliance, in addition to the system wide alert/notification described herein. Such a user observable mechanical event or condition may be, for example, opening or closing a valve, or opening or closing an electrical circuit, or actuating a solenoid as non-limiting examples. In this instance, a local observer on site with the appliances being monitored may be alerted to an issue in any suitable manner, such as by sounding an audible alarm, and/or actuating a visual indicator, such as a warning light. Such an embodiment would allow users on site to be aware of alarm events, even in the occurrence of a network disruption, such as an interruption of internet service to the location. In such an instance, it may be beneficial for each appliance, or a local server in communication with each of the local appliances to record the data and alarm logs for that location, in order preserve at least temporarily that information that would ordinarily be directed to the remote server. The duration of cached information would be limited only be the available memory storage for that appliance or local server.

Below is an exemplary flow diagram showing how data may flow within the smart monitoring system 1 according to an exemplary embodiment of the invention, detailing various functional aspects for data flow between the sensor and an end user alert.

Figures 10, 11:
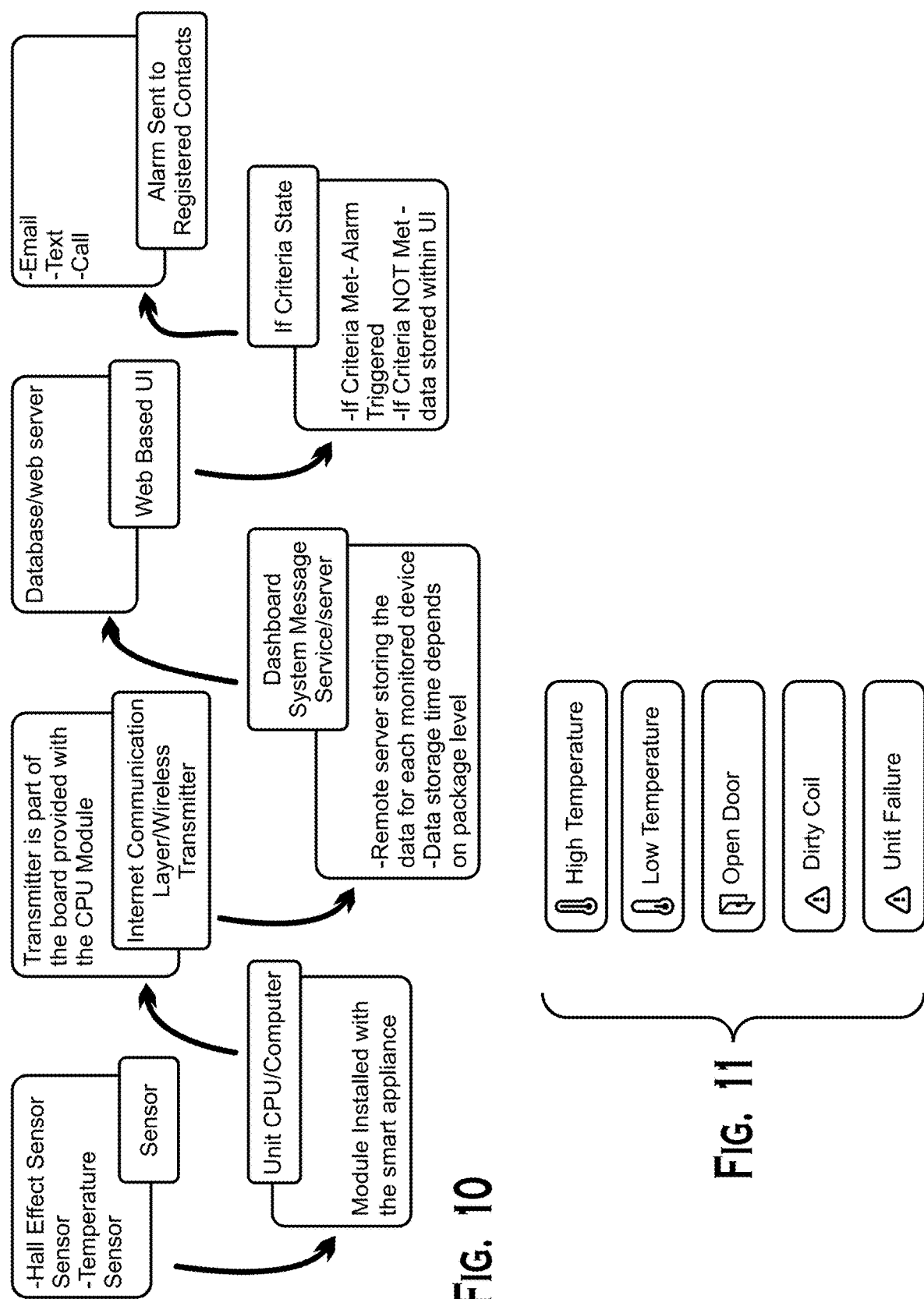

As depicted in FIG. 10, the flowpath of information in an embodiment of the invention requires a sensor 12 to gather information regarding a detectable aspect of an appliance 10. For example, where the appliance is a rolled paper dispenser, the sensor may be a hall effect sensor, such that a lever resting upon the rolled paper will vary the angle of pivot as the rolled paper is consumed, and create a corresponding movement of a detectable portion of the lever that can be sensed by the hall effect sensor, based on proximity of the hall effect sensor to a magnet, which distance varies as the lever arm is caused to pivot. In another embodiment, a gyroscope sensor, optionally with an accelerometer, may be used to provide information on the changing angle of an arm as the rolled paper is consumed. The sensor for such an appliance provides a signal to that can be detected and received by a processing unit (e.g., computer chip) associated with the appliance. The sensor values may be processed into a measurable or scaled form or provided as raw data to the communication module 14 of the appliance. Alternatively, where temperature of the appliance 10 is being monitored by the sensor 12 (such as a refrigerator, freezer, oven, etc.), the temperature probe may provide an electronic signal (e.g., voltage output) that is indicative of the sensed temperature, that is to be directed to the processing unit. The processing unit may perform calculations for converting the data into a readily comparable format, or log the values as raw data, and add relevant content, such as identification information and or time stamp information, and may convert the raw data signal into a scaled temperature signal (e.g., Fahrenheit, Celsius). The processing unit may direct the information to a log and periodically retrieve the information for sending to the dashboard system. It is contemplated that the sensed information processed by the processing unit may be sent directly to the dashboard system, where the information sent includes either or both of the raw data signal or scaled value, and any additional identifying information, to the communication module 14. The communication module 14 may transmit the data from the sensor to the router, either by wired, or wireless communication protocol, through a transmission module.

The dashboard system 50 receives the information from each of the appliances 10 within the system 1. The dashboard system 50 has a processing unit or is associated with a computing device that can access a data storage database, or data server, where the information from all of the appliances may be stored. Data storage amounts, and duration of storage may be user specified, or as determined by the dashboard system 50. The dashboard system 50 provides the information to a web based user interface or an application that can be accessed by a user and provided to a user's display 11. The information provided to the user may include the current and historical sensed information from each appliance being monitored. Additionally, the dashboard system may recognize and provide an alert to the user if there is a criteria met that would indicate an out-of-optimal range of sensed data value, by exceeding or varying from threshold values that are set for the system, either by default or by user input. Such criteria, if met, may trigger a notification to the user, or trigger an alarm condition for the particular appliance 10 or the system 1, along with identification of the nature of the alarm condition being provided to the user. The notification to the user may be in any suitable format, such as the dashboard system alerting the user by a contact methodology including one or more of email, text, call. The alert may be sent to any registered user(s) associated with the system 1, or to the specific appliance 10 that has the alert condition.

FIG. 11 provides a screen capture of exemplary alerts sent to a user's display, or included in a message to the user, as provided by the dashboard system 50 of the smart monitoring system 1, according to an embodiment of the invention. The following alerts are relevant to an appliance 10 that has a door, and monitors or controls the temperature within the appliance, such as a refrigerator, humidor, freezer, incubator, warming box, etc. Each of the exemplary alerts may be generated when a respective sensor monitoring an aspect of an appliance indicates an out of optimal range data reading that would indicate a problem and may indicate the nature of the problem. It is contemplated that one or multiple sensor readings may be interpreted by the dashboard system for the purposes of identifying which error alerts are to be sent to the user. Example alerts include: high temperature alert, low temperature alert, open door alert, dirty coil alert, unit failure alert. One skilled in the art will recognize that different sensors provide feedback on different conditions, and may require an alert that is derived or interpreted from the sensor information provided.

FIGS. 12A, B, and C provides a screen capture of exemplary alarm codes that can be provided to a user's display by the dashboard system 50 of the smart monitoring system 1, according to an embodiment of the invention. The following alarms are relevant to an appliance 10 that has a door, and monitors or controls the temperature within the appliance, such as a refrigerator, or freezer. Each of the exemplary alarm may be generated when a respective sensor monitoring an aspect of an appliance indicates an out of optimal range data reading that would indicate a problem and may indicate the nature of the problem. It is contemplated that one or multiple sensor readings may be interpreted by the dashboard system for the purposes of identifying which error alarms are to be sent to the user's display. Example alarms include: a change to an appliance set point alarm, a high temperature alarm, low temperature alarm, temperature probe failure alarm, device not connected alarm, refrigeration system failure alarm, dirty condenser alarm, open door alarm. One skilled in the art will recognize that different sensors provide feedback on different conditions and may require an alarm that is derived or interpreted from the sensor information provided.

Figure 13:
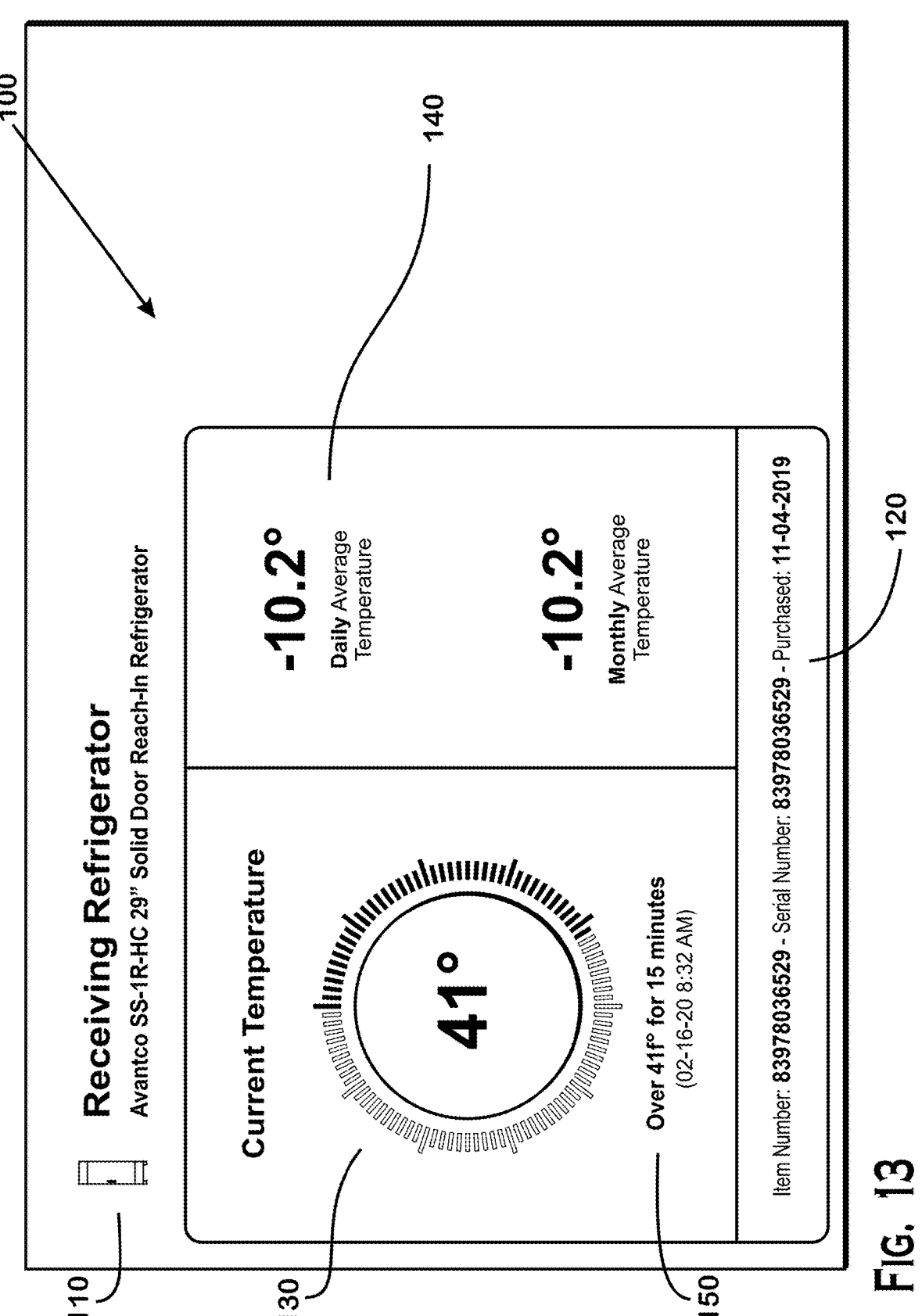
FIG. 13-17 depict representative images that may be provided to a user display within the operation of the smart monitoring system, according to an embodiment of the invention.

FIG. 13 depicts a representative screenshot of a user display providing an appliance status information update. The appliance status includes an alarm condition identifying the nature of the alarm for the user. In the exemplary embodiment depicted, the alarm indication is the temperature of the receiving refrigerator has been over 410 for a duration of time sufficient to trigger the alarm, in this case over 15 minutes. As depicted, there is provided a display module 100, that displays identifying information and relevant status and alarm information on the user display. Within the display module 100, there is provided a title module 110, an appliance ID module 120, a current status module 130, a historical status module 140, and an alarm condition module 150. The appliance title module 110 provides the name of the appliance being monitored, typically a user selected name that will readily identify the appliance for the user. The appliance ID module 120 provides detailed identification information about the appliance, such as one or more of the brand name, item number, serial number, date of purchase or installation of the appliance. Ideally, the appliance ID information, whether in part or in total, will be unique to the particular appliance being monitored and whose information is being actively displayed in the display module 100. The current status module 130 provides a readout of the sensed information, which may be in raw data form, or processed data form, as described herein. As depicted, the current status module 130 provides the data value, and may indicate where the value falls within an anticipated range of values for that appliance. The historical status module 140 provides processed data values, and may represent an average of recent historical readings, such as a short term average, for example a daily average reading; and additionally may provide a long term average, for example a monthly average reading. The alarm condition module 150 provides a summary of the alarm status for the appliance being monitored and at time stamp for the sensor reading for the appliance whose information is displayed in the display module. One skilled in the art will recognize that alternative types of appliance information could be displayed within the display module 100, with the module information updated to be relevant to the particular appliance, and the nature of the sensor information being monitored. For example, where the sensor monitors an inventory, rather than temperature being displayed in the current status module 130, the percentage of the inventory capacity may be displayed, with monthly and daily averages being provided in the historical status module 140.

Figure 14:
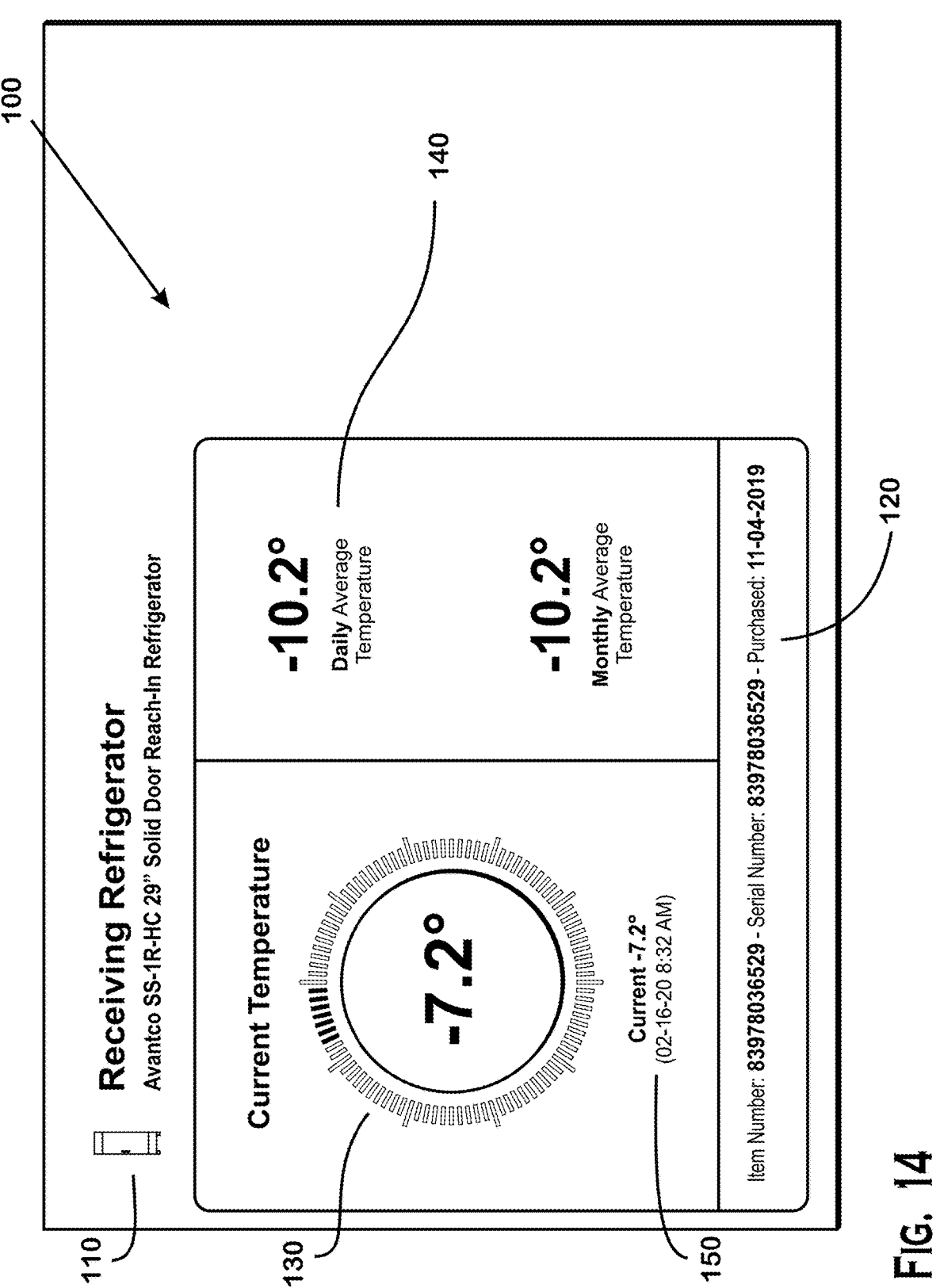

FIG. 14 depicts another representative screenshot of a user display providing an appliance status information update. The appliance status as shown does not include an alarm condition that would otherwise be identifying the nature of the alarm for the user. In the exemplary embodiment depicted the refrigerator is identified as being in an optimal range, shown here as –7.2°. As above, there is provided a display module 100, that displays identifying information and relevant status and alarm information on the user display. Within the display module 100, there is provided a title module 110, an appliance ID module 120, a current status module 130, a historical status module 140, and an alarm condition module 150, though as there is no current alarm to be shown, the alarm condition module 150 may provide the current status, and time stamp of the sensed reading. As shown, the end user can monitor one or more appliances through the dashboard.

Figure 15:
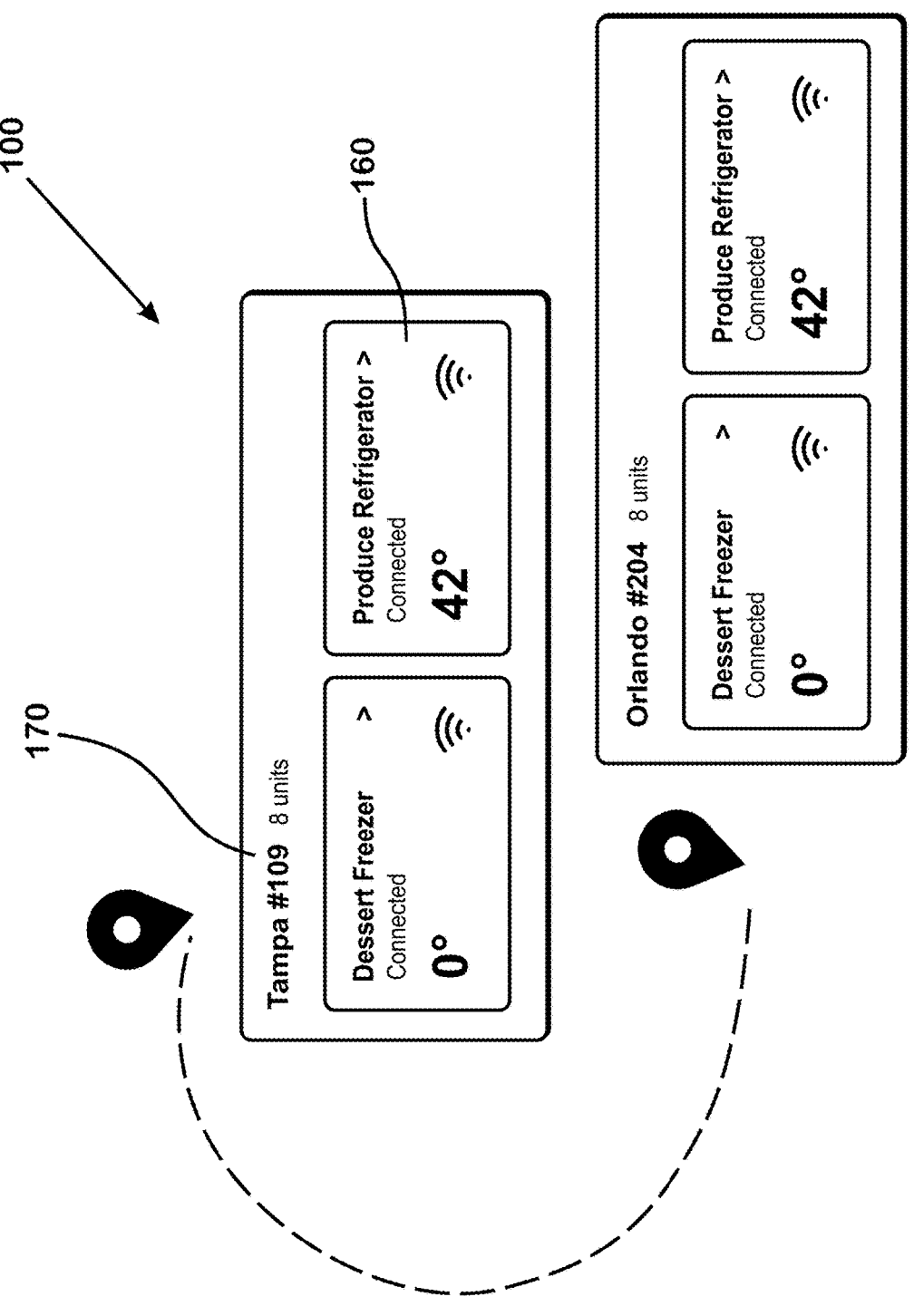

FIG. 15 depicts another representative screenshot of an exemplary user display providing a status information update for a plurality of appliances, in summary form. The user display module 100, as depicted provides multiple appliance summary modules 160, each providing the current status of the respective monitored appliances, including title, sensor value whether raw or processed. Additionally, each of the summary modules 160 indicate the functionality of the internet connectivity of the communication module 14 for each appliance 10. Furthermore, multiple appliances may be grouped by location, with each grouping of summary modules being associated with a location module 170. As shown in FIG. 15, there are two locations, each having a pair of appliances whose conditions are being reported to the dashboard system 50 and presented to the user display.

According to an embodiment of the invention, a smart monitoring system 1 can track various user settings and appliance components. By way of example, the smart monitoring system can track one or more of the following:

Probe Failures

Refrigeration System Failure

Temperature—reported on a set time increment

Dirty Condenser

Unit Connection—will report and alarm if unit becomes disconnected to designated time, allowing owners/operators to minimize Open/Closed Door—set to report if door has been opened for designated time Digital temperature, where controller sends data stream to a WiFi hardware gateway Current temperatures, alarm conditions, etc.

One skilled in the art will recognize the above listed tracked conditions or aspects are relevant to a refrigerator or freezer appliance, and for other appliance types, of a different nature, the conditions or aspects tracked may be different. Thus, the listed items are for the purpose of exemplification, and one may adapt the teachings herein for use with alternative types of appliances, including dispensing and storing devices that deliver or store goods, as non-limiting examples. Additional representative examples of appliances suitable for use within the smart monitoring system 1 will be discussed below with reference to exemplary embodiments. Should the smart monitoring system 1 detect a non-optimal sensor reading, or a sensor reading outside of a desired range of values, the smart monitoring system may log the sensed information, identify the out of range sensor, diagnose the nature of the event, and provide an alert to one or more users of the smart monitoring system 1 about the sensed data, and optionally trigger an alarm condition.

The following figures illustrate a mobile display and a web-based display on a general user interface of a dashboard according to an exemplary embodiment of the invention.

Figure 16:
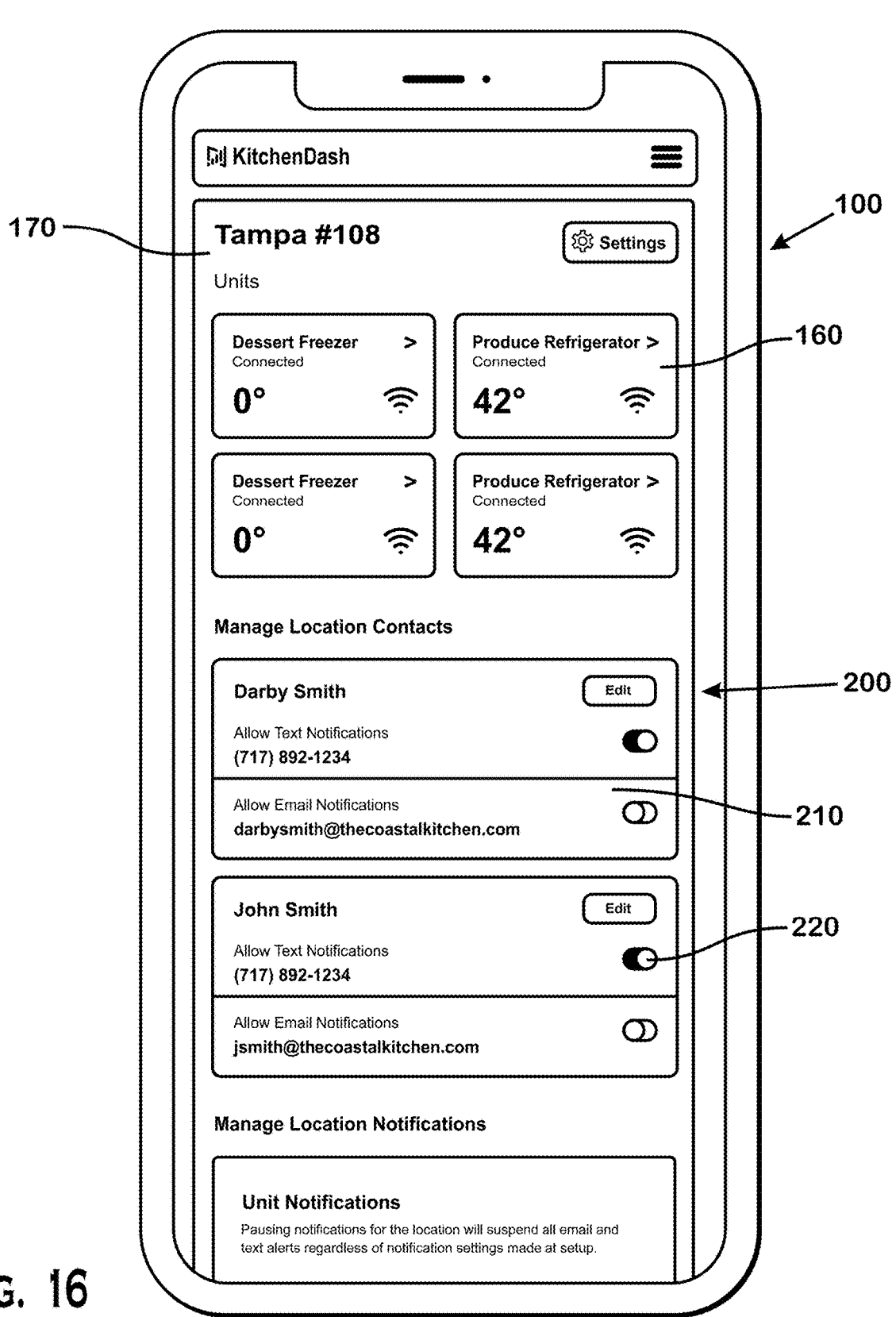

Particularly for applications on a mobile platform, the appearance and content within the user display panel 100 may be revised for visibility on a device having a limited screen size, such as smart phone. As can be seen with reference to FIG. 16, there is depicted a representative screenshot of an exemplary mobile user display, providing a status information update for a plurality of appliances, in summary form. The user display module 100, as shown, provides a location module 170, at least one summary module 160. Additionally, the user display module 100 may provide a contact management module 200, with individual contact information provided. Selection of a contact information panel 210 will allow the user to provide, or modify the username and contact method information, such as email address, phone number. Additionally, a user contact option module 220 will allow the user to define how the dashboard system 50 can contact the user, in the event that an alert is to be sent to the user. As shown, the user contact option provides a series of toggle buttons that can be turned off and on by selection, in order to enable any or all of email, phone call, and text notification.

Figure 17:
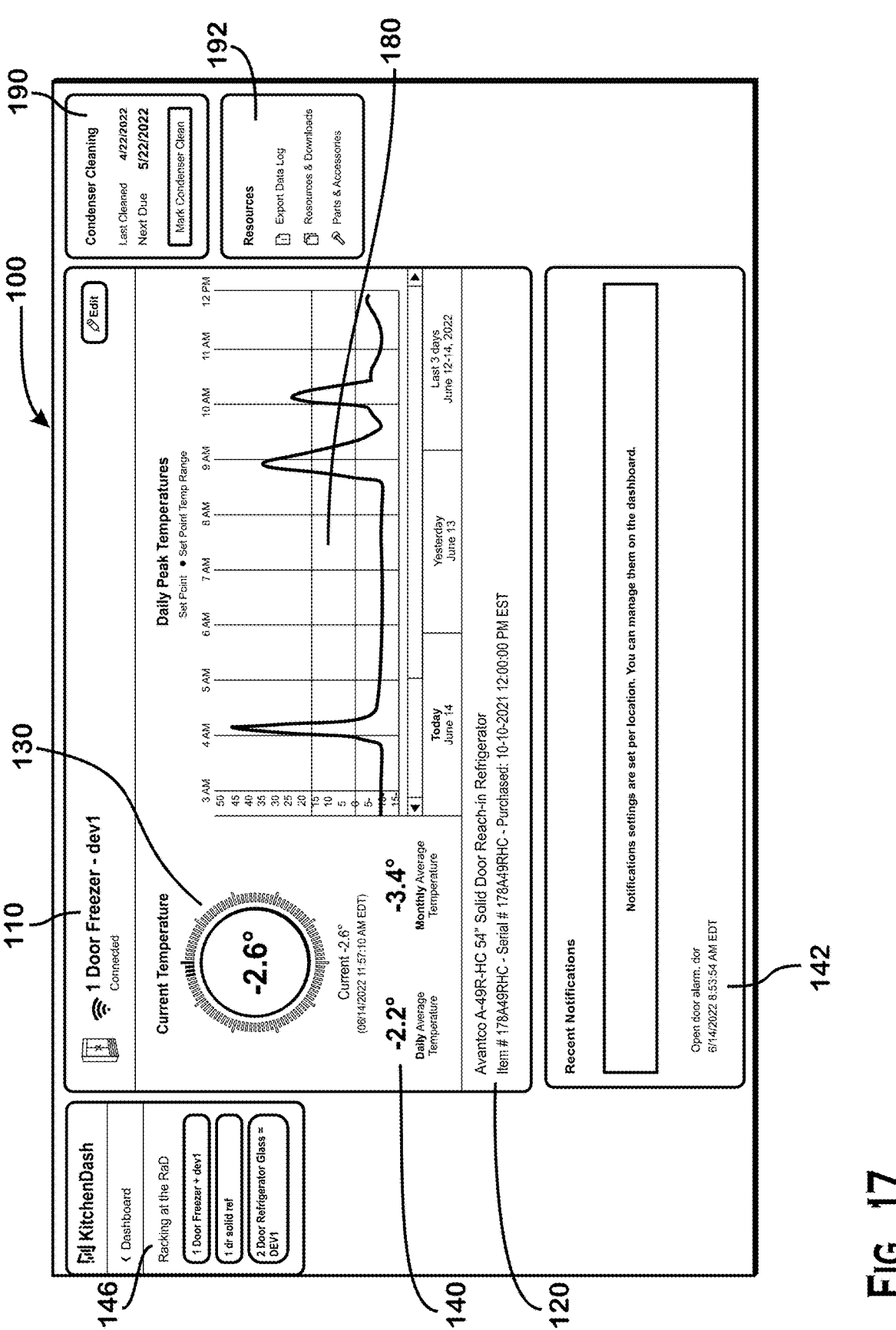

Particularly for applications on a web-based platform, the appearance and content within the user display panel 100 may be revised to take advantage of the typically larger screen size, as if typically encountered with a monitor for a laptop or desktop computer. As can be seen with reference to FIG. 17, there is depicted a representative screenshot of an exemplary we-based platform user display, providing a status information update for an appliance in detailed form. The user display module 100 for a web-based platform, as shown, provides a title module 110, an appliance ID module 120, a current status module 130, a historical status module 140, and an alarm condition module 150, as have been previously described. As with Figure O, where there is no current alarm to be shown, the alarm condition module 150 may instead provide the current status, and time stamp of the sensed reading. Should it be the case that an alarm was active, the alarm condition module may be as depicted in FIG. 13. Additionally, the user display module 100 of the web-based platform may provide a notification summary module 142, a location summary module 146, a maintenance notification module 190, a resources module 192, and a graphic display module 180. The notification summary module 142 may provide a listing of recent notifications for the appliance 10 being monitored arranged, which may be arranged in chronological order, reverse chronological order, or ranked by severity of alarm notification. The nature of the notifications that are caused to be recorded and displayed in the notification summary module 142 may be user controlled by a user interaction within the dashboard system 50, or a user setting on the user web interface. The location summary module 146 provides a location name for the location of the appliance being monitored, and additionally provides a listing of additional appliances at the location, such that the user may select any of the listed appliances for causing the user display 100 to reflect the information associated with that selected appliance. The maintenance notification module 190 provides a summary of the most recent listed maintenance event for the selected appliance and may feature a user selectable toggle or button that can indicate the performance of a maintenance event. Where a maintenance event is recommended to occur on a periodic basis, selection of the toggle or button, by the user will reset the maintenance interval tracker, such as a clock tracking the need for periodic maintenance within the dashboard system 50. The resources module 192 provides a menu of user selectable options, such as user selectable toggles or buttons to export the data log that is recorded for the selected appliance, links to resources and downloads that are related to the selected appliance, such as owner's manuals, or warranty information, and links to parts and accessories that are relevant to the selected appliance. Such information may be furnished by the manufacturer of the particular appliance. The graphic display module 180 provides a graphical representation of the sensed appliance over time. In an embodiment, and as depicted, the graphical display module provides an X-Y graph where the sensed condition is graphically displayed over time. This allows the user to visualize the performance of the appliance over a selected time scale, which may be user selectable to depict minutes, hours, days, weeks, months, etc. It is contemplated that the graphical display module need not be limited to the XY graph depicted, and may instead by a bar graph, pie chart, or any suitable graphical display. In an embodiment, the optimum range for the sensed aspect may be depicted in the graph, such that a deviation outside of the optimum range would be highlighted for the user. Additionally, alarm conditions, for example the durations of the alarm condition may be reflected in the graphical display, such as by indicating the period of alarm in a visually distinctive color in the graph. One skilled in the art will recognize that such graphical displays could easily be modified for additional types of appliances, or overlayed with the graphical display information for multiple appliances, if so desired. The user may navigate the web based display using inputs and gestures, as will be familiar to those of skill in the art, to adjust the information that is caused to be displayed in the user display module 100, such as by varying the selected appliance, manipulate the time scale, or time period depicted within the graph, and allow zooming in or out of the graphical displayed information in the graphical display module.

FIG. 9 provides an exemplary flow diagram showing an embodiment of preparatory steps in order to set up the smart monitoring system according to the invention. Exemplary actions for setting up the smart monitoring system include logging into the software using a user computing device (e.g., computer, smart phone or tablet). Logging in may be performed by scanning a QR code to call for the appropriate web page to be displayed on the user interface display, as will be familiar to those of skill in the art. Alternatively, the user may directly enter and navigate to a specified web address for performing the steps for logging in. User authentication when logging in will be familiar to those of ordinary skill in the art. Once logged into the software, the user may then add a new appliance unit, if necessary, and register the appliance unit being added by providing identifying information, with at least a portion of the identifying information provided being unique to the specific appliance. In an embodiment, the information provided for registering the appliance unit may include model information, a unit serial number, and a media access control (MAC) address for the appliance unit. Authentication of the relationship between the user's device and the system 1, including any of the appliance(s) added to the system, may be performed in any suitable manner, as will be familiar to those of skill in the art. In an embodiment, confirmation of the appliance authentication within the network for use within the system may be performed by sequentially connecting the user's device to a local network provided by the appliance unit (such as by providing the appliance unit's network name and at least a portion of the units MAC address. With the user's device connected to the appliance unit's network, the user will be prompted to configure the appliance unit, and provided with login information, including a username and password for connecting the appliance unit, the user may then provide access for the appliance unit to the local network on which the system will operate, such as a location's Wi-Fi network.

With the appliance unit now connected to the local network for the site or building, the user's device may then reconnect to the same network that the appliance unit is now connected to. Initial identification information, as assigned by the user at the user's location, may then be provided to the appliance unit, by providing a unit name for the appliance that will identify the appliance to the user, and further, the appliance is assigned a location, that the system will include as appliance identifying information, as discussed above. Additionally, the user may assign one or more contacts to associate with the appliance unit, such as by providing an email address, phone number, or desired address for text messages, as appropriate, and may further assign operational information, such as desired threshold values for sensors, or other information as may be required for operation of the system 1.

The smart monitoring system is an all-encompassing ecosystem of products that can monitor various appliances items, such as the exemplary appliances discussed above, including, but not limited to refrigerators, freezers, cooking equipment, holding equipment, dishwashing machines, ice machines. Details and aspects of exemplary appliances 10 for use within the smart monitoring system 1 are discussed below. It is understood that the smart monitoring system may be applicable to common janitorial inventory, chemical inventory, and front of house dispensing (i.e., paper products, soap, air fresheners, air filters, water filters, cleaning chemicals, condiments, cutlery, straws, etc.). For products that use consumable products (janitorial, chemical, liquids, consumable items, and front of house dispensing such as condiments, cutlery, straws, etc.), smart monitoring system will calculate the product usage, compare that to known inventory levels, and then automatically or semi automatically reorder replenishment products for the customer.

It is contemplated that any suitable replenishment strategy may be employed within the operation of the smart monitoring system. Exemplary replenishment strategies are discussed below. One skilled in the art will recognize that the following replenishment strategies are examples only and may be modified for particular applications and fall within the spirit of the teachings herein.

The system 1 may monitor various appliances 10, tracking the usage of consumable items, or stored inventory of products associated with each appliance 10. An integrated system that monitors the rate of usage of consumables or products within the various appliances may also anticipate the need to replenish the monitored quantity of goods, as inventory amounts are reduced through use and consumption. For example, where the monitored appliance is a stockroom appliance, and the sensor is configured to track the removal of inventory products and monitor the percent remaining of a desired inventory of products, the system may allow the user to determine an appropriate strategy for replenishing the appliance.

In an embodiment, the user may set a minimum inventory threshold for a product or good being monitored that is associated with the appliance 10. Once the inventory has been reduced, and the sensor 12 of the appliance determines that the minimum level has been reached, they system may initiate a reorder of the product. Such a reorder may be facilitated by an electronic communication with a source of the product or facilitated through an order processing service offering a variety of products or goods. One skilled in the art will recognize that e-marketplace options exist for a variety of goods, and many of these services offer web-based orders and automated orders. The user may determine which product to have ordered and may specify the supplier. Alternatively, the dashboard system may review a variety of sources, such as may be provided in a database, and may provide a listing of products, including alternative substitute products that may perform similarly.

The system 1 may, follow a user selected replenishment strategy, whereupon an order of a pre-determined quantity of product may be made to replenish the inventory. The amount to order may be a default value determined within the system, or alternatively, a user determined value, as set through the user interface.

The system 1 may, in a first replenishment strategy, order an amount of product as specified within the system as an automatic response to the minimum product threshold being reached. Such an order may occur autonomously within the dashboard system, without requiring review and/or approval of the user. This is termed an automatic reorder.

The system 1 may, in a second replenishment strategy, order the amount of product, subject to the condition that prior notice has been provided to the user, whether by email, or text, or phone call. Such correspondence may alert the user that a planned replenishment will occur in the near future, such as within an appropriate period of time, for example, the message may specify a particular date, and or time, within the subsequent week. The order will automatically become effective at the specified time, unless the user acts to change, or cancel the pending order. This is termed a semi-automatic reorder.

The system 1 may, in a third replenishment strategy, create a pending order for the amount of product, e.g., place replenishment product into the users shopping cart, but not finalize and execute the order until such a time as the user has expressly approved the planned order. The user may be alerted to the pending order by notice provided to the user, whether by email, or text, or phone call. Such correspondence may alert the user that a planned replenishment will occur once approved and identify the quantity and specify the goods being replenished. The order will automatically become effective at the time of approval by the user, or once approval is noted within the system 1. This is termed a semi-manual reorder.

The system 1 may, in a fourth replenishment strategy, initiate no pending order for the amount of product, e.g., place replenishment product into the users shopping cart, but rather may instead serve notice to the user of the low inventory status of the respective appliance 10. The user may opt out of any form of reordering within the system, and instead rely on the system only to provide alerts as to low inventory, and the user may initiate a replenishment order separate and apart from the dashboard system 50. This is termed a no-reorder, or fully manual replenishment by the user.

In an embodiment, as an appliance, such as a dispenser, is filled with a quantity of product or goods, the appliance may send an update to the system 1 to indicate a corresponding amount of product has been removed from the stock room, for the purposes of tracking inventory outside of the appliance 10. Such a system may cooperatively engage with additional appliances to track not only the product remaining in the respective appliance, but also the quantity of product that is provided in a general stock room that may be utilized for resupplying a plurality of appliances with product.

Application of a Smart Monitoring System—Exemplary Embodiments

The application of a smart monitoring system, using one more sensors 12 monitoring an aspect or condition associated with an appliance 10, which may be any suitable appliance type, is contemplated by the teachings herein. The smart monitoring system 1 may be provided for use with appliance 10 applications that monitor a variety of conditions or aspects, and may be also be provided for appliances 10 that may monitor an inventory of materials, goods or liquids, and the like, and/or monitor appliances or stored inventory that may need to be periodically maintained or replenished with replacement inventory products, such as materials, goods or liquids. Using the teachings of the specific exemplary embodiments, one skilled in the art will recognize that the various appliances, and the nature of the sensors could be modified for a particular use, and fall within the spirit of the teachings herein, with the limitations of the possible combinations of appliances 10 and sensor 12 type combinations limited only by imagination. The smart monitoring system will be described with reference to the following exemplary applications, including: a smart rolled material dispenser (e.g., paper towel roll, bathroom tissue roll; metal foil, plastic wrap, wax paper) a smart liquids dispenser for dispensing any flowable product (e.g., soap dispenser, sanitizing liquid dispenser); a smart temperature controlling apparatus (e.g., refrigerator/freezer/oven); and a smart inventory detector appliance (e.g. smart shelf, smart scale).

In a first exemplary embodiment of the smart monitoring system 1 according to the invention, a smart rolled material dispenser is provided to work with the dashboard systems 50 described previously. According to an exemplary embodiment of the invention, the smart rolled material dispenser may be a rolled paper product dispenser. It is contemplated that the rolled material dispenser may be provided for use with dispensing any variety of suitable rolled material products, including, but not limited to, the previously mentioned paper product, but also applicable for example with metal foil, wax paper, butcher paper, wrapping paper, bubble wrap, plastic wrap, as non-limiting examples. In an embodiment, the smart rolled material dispenser generally include a rolled material dispenser housing having an integrated monitoring device. In an embodiment, the integrated monitoring device is provided having one or more pivot arms and a module housing having an electronics board, such as a printed circuit board (PCB) associated with a sensor that can detect a change in angle as the arm(s) is caused to pivot, a processing unit, and transmission device, such that the device may measure a diameter of a roll of material associated with the housing, process the sensed information from the sensor, and may transmit the information to the dashboard system 50. Optionally, the processing unit may log the sensor data, and process the sensor data in order to calculate and transmit a % of material roll remaining.

In the shown exemplary embodiment of FIG. 18A, the rolled material dispenser is a smart paper dispenser 300 and is outfitted with a custom housing 302, that includes rotation arms 310 and electronics 340 and sensors 350 that are configured to measure the diameter of the roll(s) of paper within the dispenser. Power for the smart paper dispenser 300 may be provided by mains power, or alternatively by onboard batteries inserted within the housing 302, such that the electronics and communication means can function independent of an exterior power source. As shown, each of the rotational arms have a free end 330 that will rest against, and ride on the outside diameter of the roll(s) of product, pivoting about a pivot end 320 that is pivotably mounted to the housing 302, such that the angle of each arm 310 will shift in response to the varying diameter of an installed roll of paper being monitored by each arm 310. The sensors 350 may be mounted on an electronic board (PCB board) that provides a processing unit and communication means for transmitting the sensor information to the dashboard system 50, previously described. In the shown embodiment, the sensor 350 may be a hall effect sensor that detects the movement of the arms 310 by changes of a magnetic field, such as where a magnet is located on the arm 310. One skilled in the art will recognize that a sensor may be mounted to the arm, and the magnet provided on a fixed location, such as the housing 302, electrical board 340, or cover 360. Alternatively, a different sensor type, not requiring a magnet may be provided, such as a gyroscope sensor or accelerometer sensor, as will be discussed below. The smart paper dispenser may thus use one or more sensors to calculate a position reading of the arm 310. This reading, through a series of calculations, may be translated into the % of roll remaining value. The system 1 may rely on an instant read from the sensor 350 to derive the current percentage of the roll remaining. Alternatively, a plurality of sensor values may be taken and averaged to determine the percentage of the roll remaining, and in this manner, may discount or ignore outlier readings, such as may occur with an out-of-round roll. Where multiple readings are utilized for tracking the percentage of the roll remaining within the unit, the system may utilize a mean value, a mode value, or a weighted value to assess the roll status, such as the percentage of the roll remaining, where a roll is initially provided having a known diameter corresponding to the 100% roll remaining value, and a known diameter corresponding to the 0% roll remaining value. For example, with a weighted value, several readings may be taken as the paper is dispensed, with the system identifying high and low values that may be ignored by the system, corresponding to the high and low regions associated with an out-of-round roll, thus weighting more heavily the remaining mid-range values for providing an average reading for the % roll remaining. In addition to the % of roll remaining, the dispenser may also perform a series of calculations to determine the number of times the roll is changed within the roll dispenser 300. This information may be logged, along with sensor readings, and wirelessly transmitted by a communication module associated with the electronics board 340, such that the information collected is directed to a web platform (e.g., the dashboard system 50), such that a user may view the status of their dispenser, as well view the number of rolls consumed by the dispenser. Such a web platform for appliances may be configured to keep track of their current paper inventory remaining in a storage area and compare that value to the number of rolls consumed by the dispenser. This information can be used to automatically initiate a reorder of the monitored products for the user or provide an alert for the user of a low inventory level, using any of the replenishment strategies discussed above. An exemplary perspective view of a paper roll dispenser of FIG. 18A can be seen with reference to FIG. 18B, having a partial roll and an empty roll. Note in FIG. 18B the positional differences of the arms 310 associated with each roll.

Figures 18B, 19A, 19B:
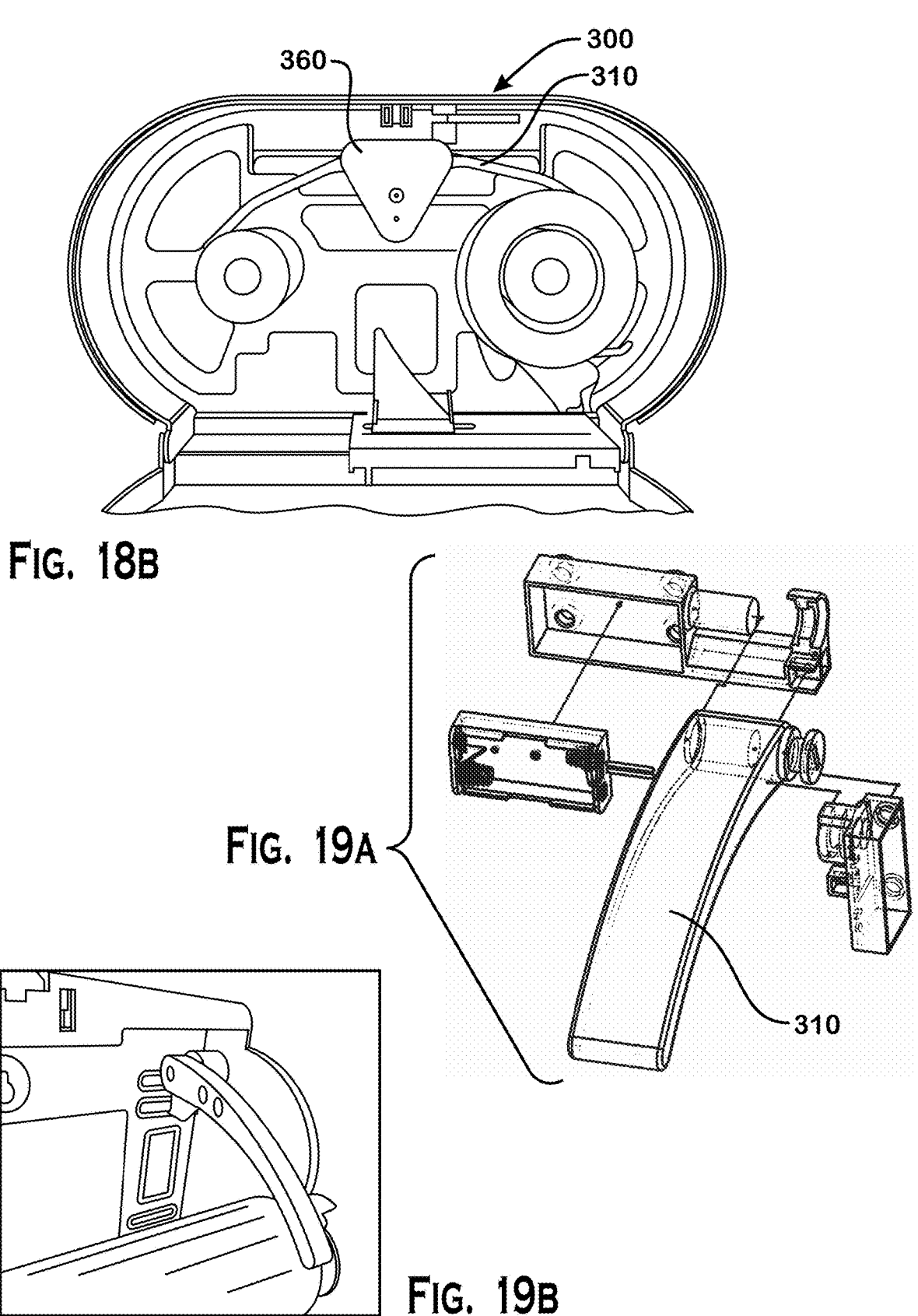
FIGS. 19A and 19B and FIG. 20 depict various embodiments of an appliance that is a smart rolled product dispenser that monitors the remaining product within the dispenser, according to embodiments of the invention.

A portion of an alternative embodiment of a rolled paper dispenser 300 is shown in FIG. 19A. This embodiment illustrates a single arm design. Such a paper dispenser may operate similar to the double arm embodiment described above, only providing a single pivoting arm 310, with a free end that rests upon the exterior surface of the rolled paper product. The pivoting end may be pivotably secured to a housing that is secured to the dispenser for the rolled paper product. As the arm 310 is caused to pivot about the pivot end, the angle of the arm is measured by a sensor, that is in electronic communication with the electrical board. As described previously, such a rolled paper dispenser may be powered by an exterior source of power, or, as shown, powered by on-board batteries associated with the housing 302.

An exemplary perspective view of a paper roll dispenser of FIG. 19A can be seen with reference to FIG. 19B, having a partial roll arranged within the dispenser 300. Note in FIG. 19B, the free end 330 of the arm 310 rides against the exterior surface of the rolled paper product, and the angle of the arm will change, pivoting at the pivot end mounted to the housing 302, in response to varying diameters of the rolled paper product.

Figure 20:
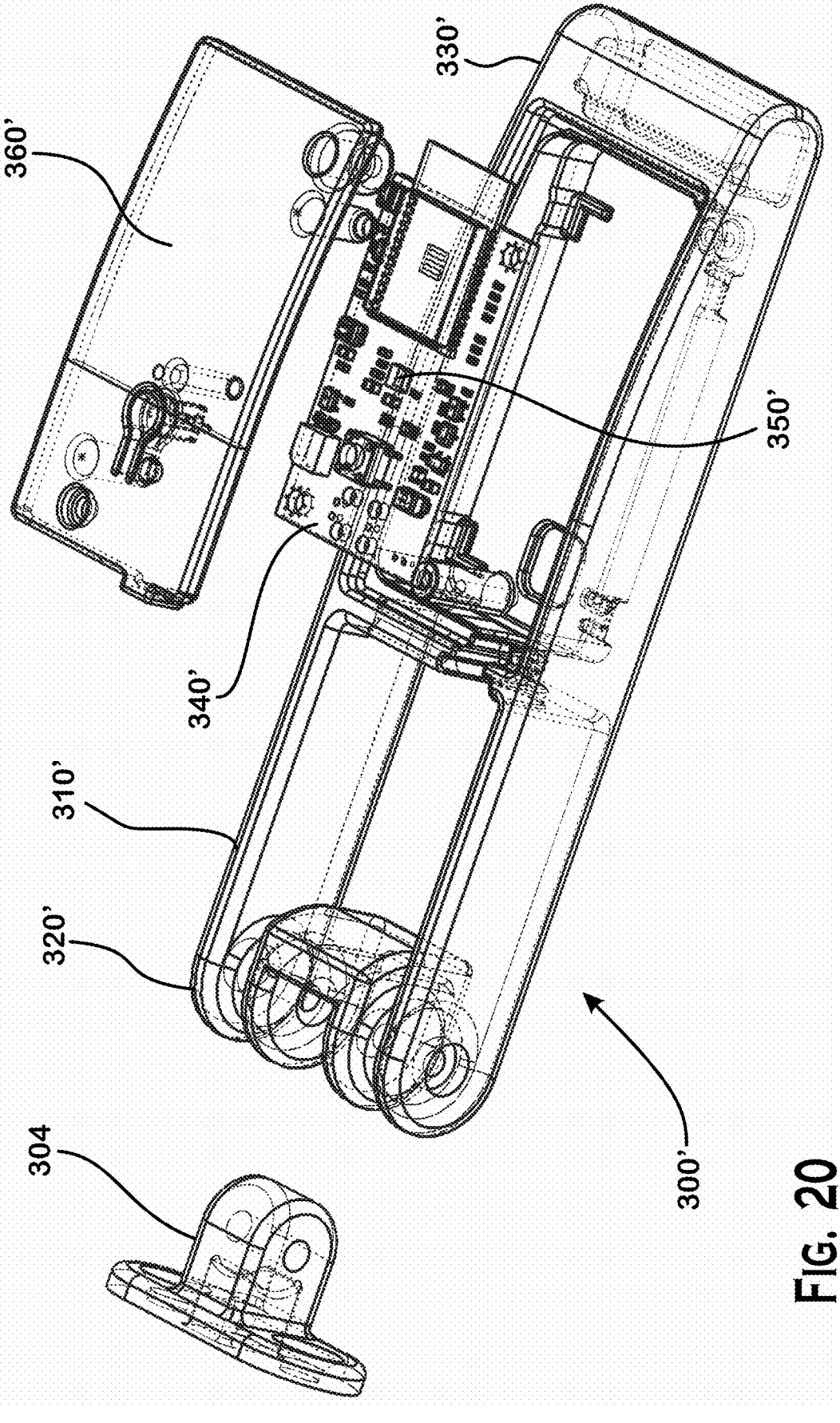

In another embodiment of the smart rolled paper dispenser 300', and with reference to FIG. 20, there is provided a smart paper dispenser having a single pivoting arm 310' that is pivotably mounted by a mount 304 to the body of the rolled paper holder. As before, the arm 310' has a pivoting end 320' that is pivotably affixed to the mount 304, and a free end 330' of the arm 310' that is configured to ride against the exterior surface of the rolled paper product within the dispenser. The arm 310' also provides a compartment for receiving the electronics 340', which may contain a processing unit, communications module, such as may be provided on a PCB, and at least one sensor 350'. Power for the electronics may be provided by batteries, such as those provided for operating a motor to dispense paper towel on demand, as will be familiar to those of skill in the art. The sensor 350' may be any suitable sensor type that can detect and indicate a change in the angle of the arm 310'. As shown, the sensor 350' may be a gyroscope sensor, or a combined accelerometer and gyroscope sensor, that is configured to detect and send a signal to the processing unit in order to record the varying arm angle as paper product is dispensed. As before, the signal from the sensor may be recorded as a raw data value or may be converted by the processing unit to a scaled measurement, such as the % roll remaining.

Additionally, the processing may account for out of round rolls, or averages of a plurality of readings, as has been discussed previously. The electronics 340' may be sealed by a cover 360' that secures to the arm 310' to enclose the electronics in a compartment.

Figure 21:
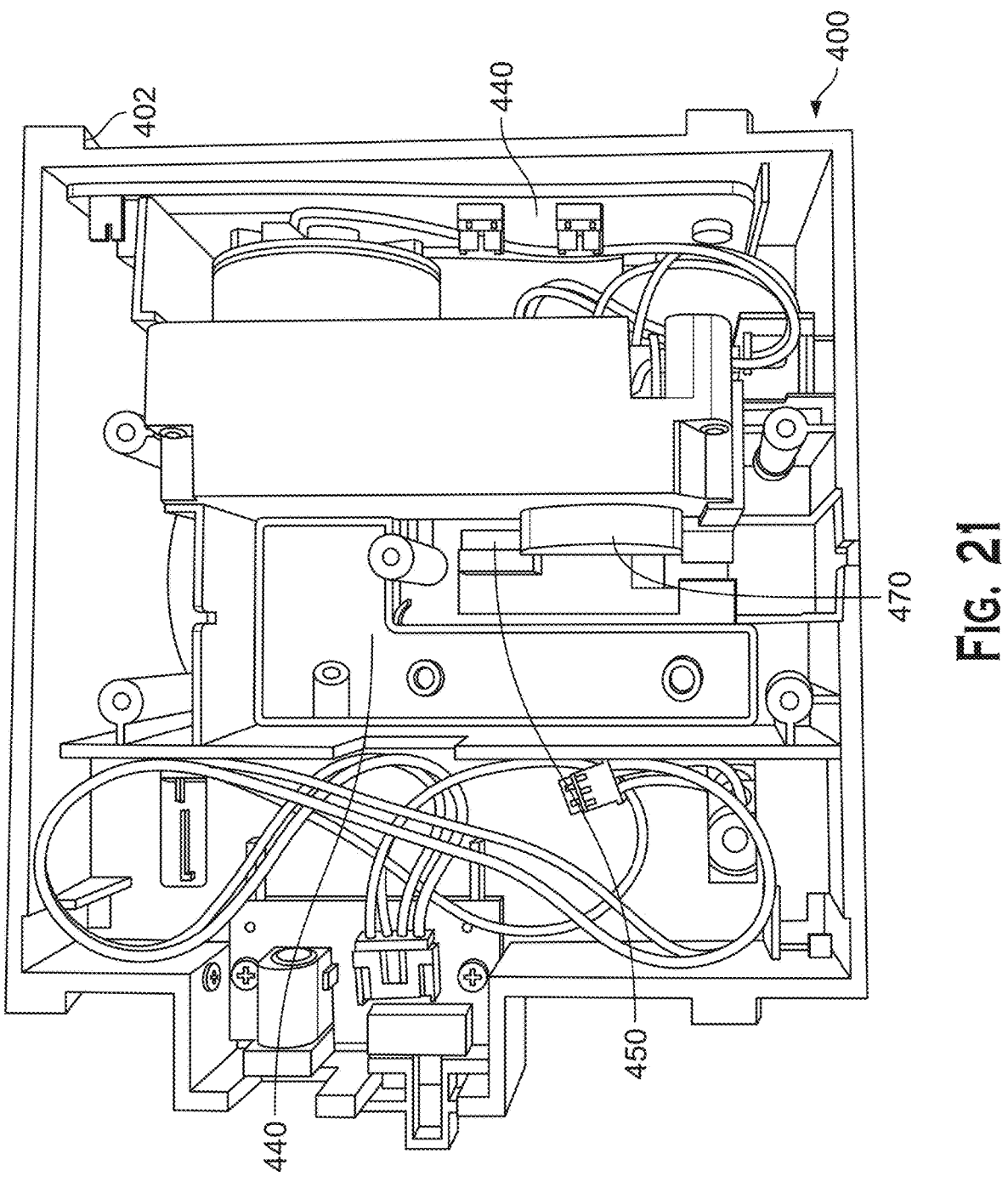
FIG. 21 depicts an appliance that is a smart liquid dispenser that monitors the remaining product within the dispenser, according to an embodiment of the invention.

In a second exemplary appliance embodiment, for the smart monitoring system 1 according to the invention, a smart liquid dispenser is provided to work with the dashboard system 50 described previously. According to an exemplary embodiment of the invention, the smart liquid dispenser 400 generally includes a housing 402 containing an amount of a liquid to be dispensed from the dispenser, which may be provided in a replaceable or refillable container. With reference to FIG. 21, the smart liquid dispenser 400 additionally provides electronics 440, which may be one or more printed circuit boards. The electronics 440 may include a processing unit, and communications module, and associated with a sensor 450. The electronics 440 may direct the operation of the pump motor, and may monitor a triggering occurrence where the user initiates the sequence for the pump operation, such as when a user touches a trigger, places a hand underneath a hands-free sensor to call for the pump to dispense an amount of liquid, as will be familiar to those of skill in the art. The smart liquid dispenser may additionally provide a pump 470, which in an embodiment, may be manually operated, or as shown, a pump motor may actuate the pump mechanism for the pump 470, so as to dispense a determined volume of liquid when called to do so. The electronics for the smart liquid dispenser may be powered by exterior power source, such as mains power, or by onboard batteries, associated with the housing 402. The smart liquid dispenser provides a sensor 450 that can detect operation of the pump 470, or in an embodiment, may detect or track the volume of dispensed liquid. In an embodiment, the sensor 450 may be a hall effect sensor, placed near a portion of the pump, such that the sensor may detect each cycle of the pump 470 as an amount of liquid is called to be dispensed, where operation of the pump will move a magnet associated with the pump mechanism. It is contemplated that a variety of sensors may be utilized, and one skilled in the art will understand the substitution of one sensor type for another may be possible, with adjustments to the pump mechanism, as will be familiar to those of skill in the art. For example, the sensor may be an accelerometer that tracks actuation events of the pump, as an alternative to a magnetic, or hall sensor embodiment. Or each pump cycle may trigger sensor such as a reed switch, or physically press a button or trigger that can be electronically monitored to ascertain each pump cycle as it occurs. The processing unit of the smart liquid dispenser 400 will log the count of each pump cycle and may periodically transmit the sensed information to the dashboard system 50, in the manner described previously.

In an embodiment, a container of liquid may be placed in the housing 402, where each container will provide a known quantity of liquid, and the smart liquid dispenser will be set to associate a full container with a number of dispensing pump cycles (e.g., 0 pump cycles) and track each iteration of a pump cycle until the liquid container within the smart liquid dispenser is anticipated as being, or approaching the status of being empty. For example, where a container contains 1 L of liquid, and each pump cycle delivers 1 mL of liquid, the smart liquid dispenser would assign a full value to the container where 0 pump cycles have been actuated (or 1000 cycles are remaining), and an empty condition where 1000 pump cycles have been actuated (or 0 cycles are remaining) as detected and recorded by the processing unit. The smart liquid dispenser may provide an alert when a threshold count of pump cycles is reached, for example, when 900 pump cycles have occurred, such that the dashboard system may alert the user to the need to replace the container. Replacement of the container within the smart liquid dispenser 400 may automatically reset the pump counter to 0, or alternatively, the user may indicate the container of liquid has been replaced, or refilled, and reset the counter for the pump 470.

Figure 22:
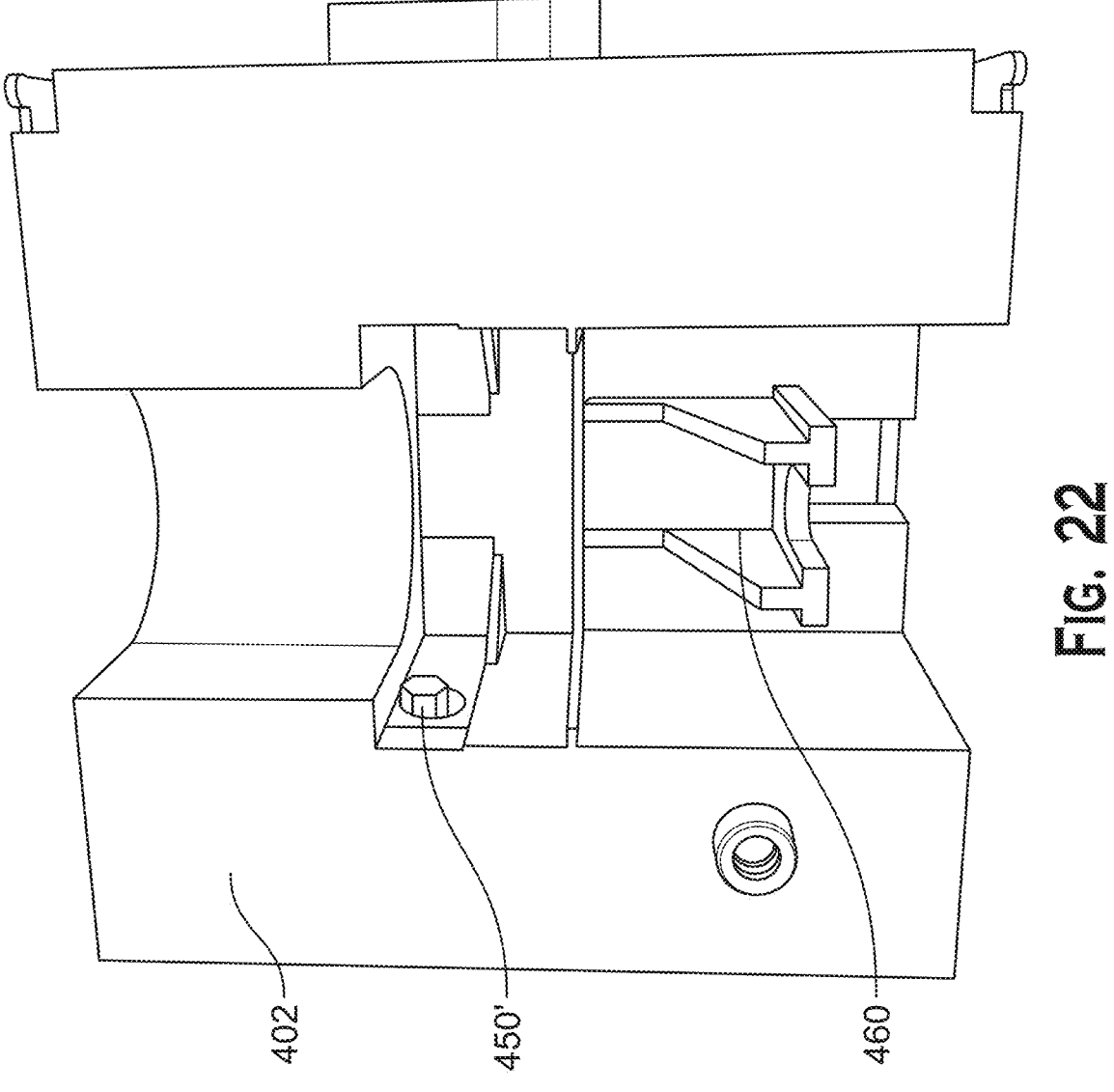
FIG. 22 depicts an appliance that is a smart liquid dispenser that monitors the container within the dispenser, according to an embodiment of the invention.

In an embodiment of a smart liquid dispenser, and as depicted in FIG. 22, the smart dispenser 400 includes a second portion of the housing 402 which can fit against the housing 402 of FIG. 21, in order to create an enclosure, with a holding fixture 460 for securing a container thereto. The holding fixture 460 of the smart dispenser 400 is configured to store and allow replacement of a container of liquid from the housing 402, where the removal of the container will be detected by another sensor 450' of smart liquid dispenser 400. The sensor 450' may be different from the sensor 450 of the smart liquid dispenser 400 discussed above. Where the sensor 450 previously discussed serves to monitor pump actuation cycles, or monitor liquid levels remaining in a container; in contrast, the sensor 450' is configured to detect removal and/or replacement of the container that triggers the sensor 450'. The sensor 450' may be any suitable sensor type, such as an optical detector, a pressure switch, a magnetic sensor or reed switch, where the condition of the sensor will be triggered upon removal of the container from the dispenser 400, which may include a sensor trigger, either as a physical aspect of the container, or by inclusion of, for example, a magnet or RFID chip that can be detected and the removal or replacement of the container sensed and recorded by the appliance. Alternatively, the sensor 450' may detect user triggering a mechanical or digital reset trigger switch which provides a signal to the sensor of the reset condition, either as part of the act of replacing the container, or as a distinct action confirming the replacement of the container. As before, the smart liquid dispenser 400, may further be provided with a source of power, for powering any of the pumps, sensors, or electronics, such as on board batteries provided within the housing 402, and have electronics including a processing unit, and communication module, such that upon detection by the sensor 450' of the removal or replacement of the container, the sensor information is logged, and sent by the communication module to the dashboard system 50, alerting the system 1 to the removal of a container from inventory, or the refilling of the dispenser, and noting the reduction in resources remaining. In an embodiment, one or more smart liquid dispensers 400 may collectively be provided for dispensing and monitoring liquid containers, and each operating independently and reporting to the dashboard system 50. Upon notification to the dashboard system from the dispenser 400 of consumption of resources, the remaining inventory count may be adjusted. Thus, it is contemplated that the system 1 may provide multiple dispenser appliances 400 for example where a plurality of liquid dispensers are a soap dispenser, with multiple dispensers provided in a lavatory; or a single dispenser appliance 400 may be provided at a washroom sink, any of which may be monitored or tracked with one or more sensors, such as the sensor 450, or 450'. The system 1 may provide an alert to the user when the liquid remaining in the dispenser is low, or when the system recognizes that an inventory of replacement containers (for example as tracked in a storeroom) is deemed low, and the system 1 may initiate a replenishment strategy as detailed previously.

In a third exemplary appliance embodiment, for the smart monitoring system 1 according to the invention, a smart temperature controlling apparatus is provided to work with the dashboard system 50 described previously. According to an exemplary embodiment of the invention, the smart temperature controlling apparatus 500 generally includes a device configured to insulate and provide a desired temperature. Such devices will be familiar to those of ordinary skill in the art, and include devices such as refrigerators, freezers, and ovens, as non-limiting examples. For incorporation within the smart monitoring system 1 however, the smart temperature controlling apparatus 500 further provides one or more sensors 550, and electronics 540 including processing unit and communication module, as has been previously described. Power for the electronics may be provided by the outside power source utilized for operating the temperature controlling apparatus 500, such as mains power. The electronics 540 may be integrated within the temperature controlling device, fitted within the cabinet, or may be fitted to the exterior of, or otherwise associated with the temperature controlling device. For example, where the smart temperature controlling apparatus 500 is a refrigerator, the electronics 540 may be provided within the cabinet of the unit, but not necessarily within the temperature-controlled space, for example by being placed within the region of the device where the compressor is located. The smart temperature controlling apparatus 500 will be described with reference to an embodiment that is a refrigerator, though it is recognized that one skilled in the art will be able to apply the teachings herein for a freezer, an oven, or an icemaker with minimal modification to the nature and placement of the sensors and electronics required.

Figure 23:
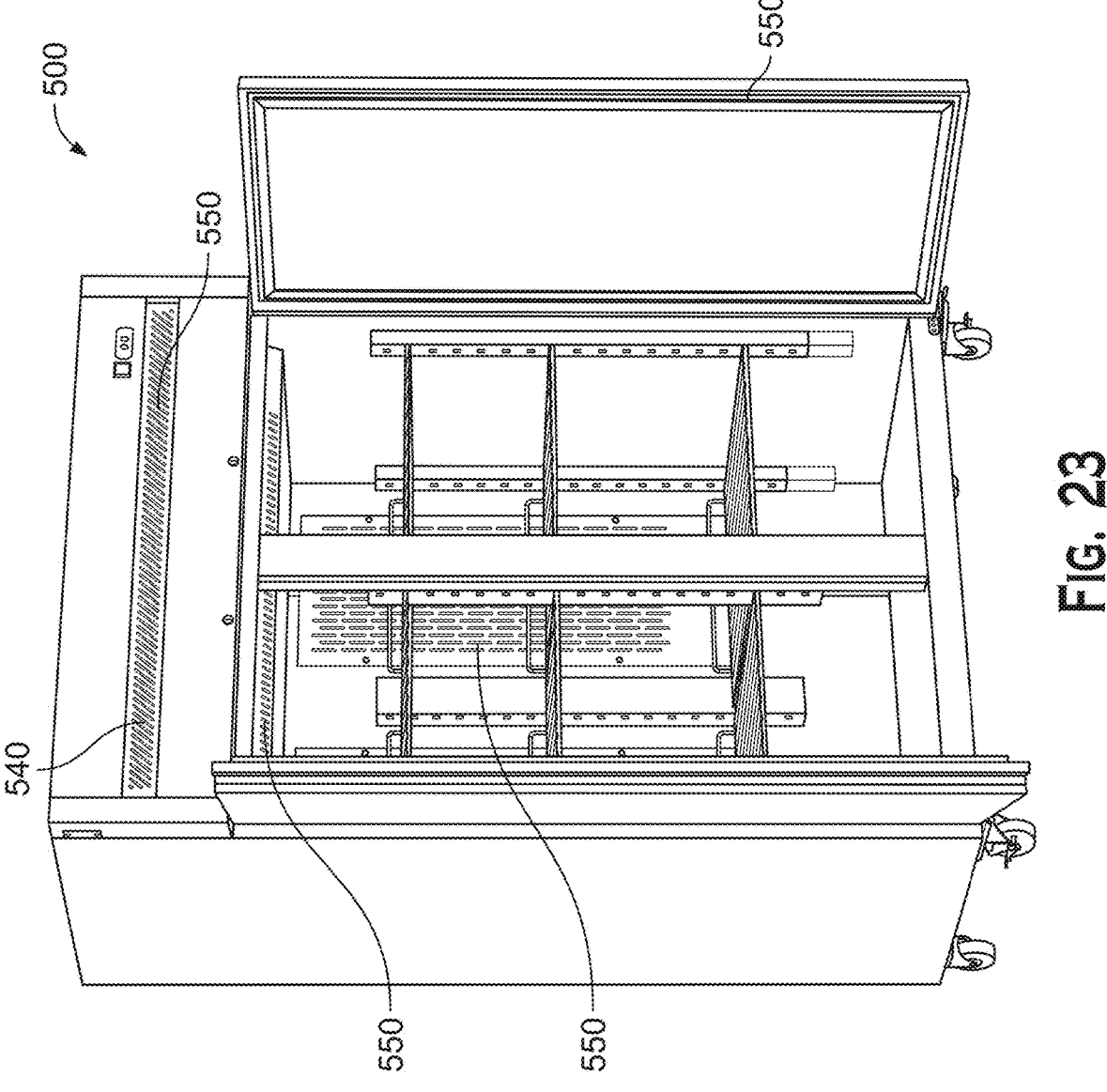
FIG. 23 depicts an appliance that is a smart temperature regulating appliance, such as a refrigerator, having sensors to monitor and report on monitored aspects of the appliance, according to an embodiment of the invention.

With reference to FIG. 23, an exemplary smart refrigerator is depicted as the exemplary smart temperature controlling apparatus 500. As shown, the refrigerator is provided with standard refrigerator features, such as a cabinet, one or more doors, and provides temperature regulating features as are known to those of skill in the art. Additionally, there are provided multiple sensors 550, such as temperature probes for monitoring the cabinet temperature, or for monitoring the compressor temperature and/or coil temperature, door monitoring sensors (such as reed switches), voltage monitors, ice capacity sensors, etc. One skilled in the art will recognize that any variety of sensor application may be deployed and provide data regarding a sensed condition or aspect to the processing unit for the electronics 540, which may be logged, and periodically transmitted to the smart dashboard system 50. Such transmissions may be initiated periodically, or upon occurrence of an event or alarm condition, such as where a door is left open, where a temperature deviation from an optimal range is detected, or where a problem with the performance is detected, such as a unit failure, or dirty coil. Alarm conditions associated with a refrigerator are described with reference to FIGS. 12A, B, and C.

In a fourth exemplary appliance embodiment, for the smart monitoring system 1 according to the invention, a smart inventory detector appliance 600 is a smart appliance 10 provided to work with the dashboard system 50 described previously. According to an exemplary embodiment of the invention, the smart inventory detector appliance 600 generally provides a storage container, unit, or device configured to hold an inventory of product, and provides one or more sensors 650 associated with the storage unit that can monitor an inventory of product, and track and report to the dashboards system 50 as the product is consumed or removed from the storage unit. The smart inventory detector provides electronics 640 in association with the one or more sensors 650, where the electronics include at least a processing unit, such as a computer chip, and a communications module. In an embodiment, the sensor 650 is any suitable sensor type for monitoring a product inventory and detects the removal of an amount of inventoried product from a storage area or unit.

Figure 24:
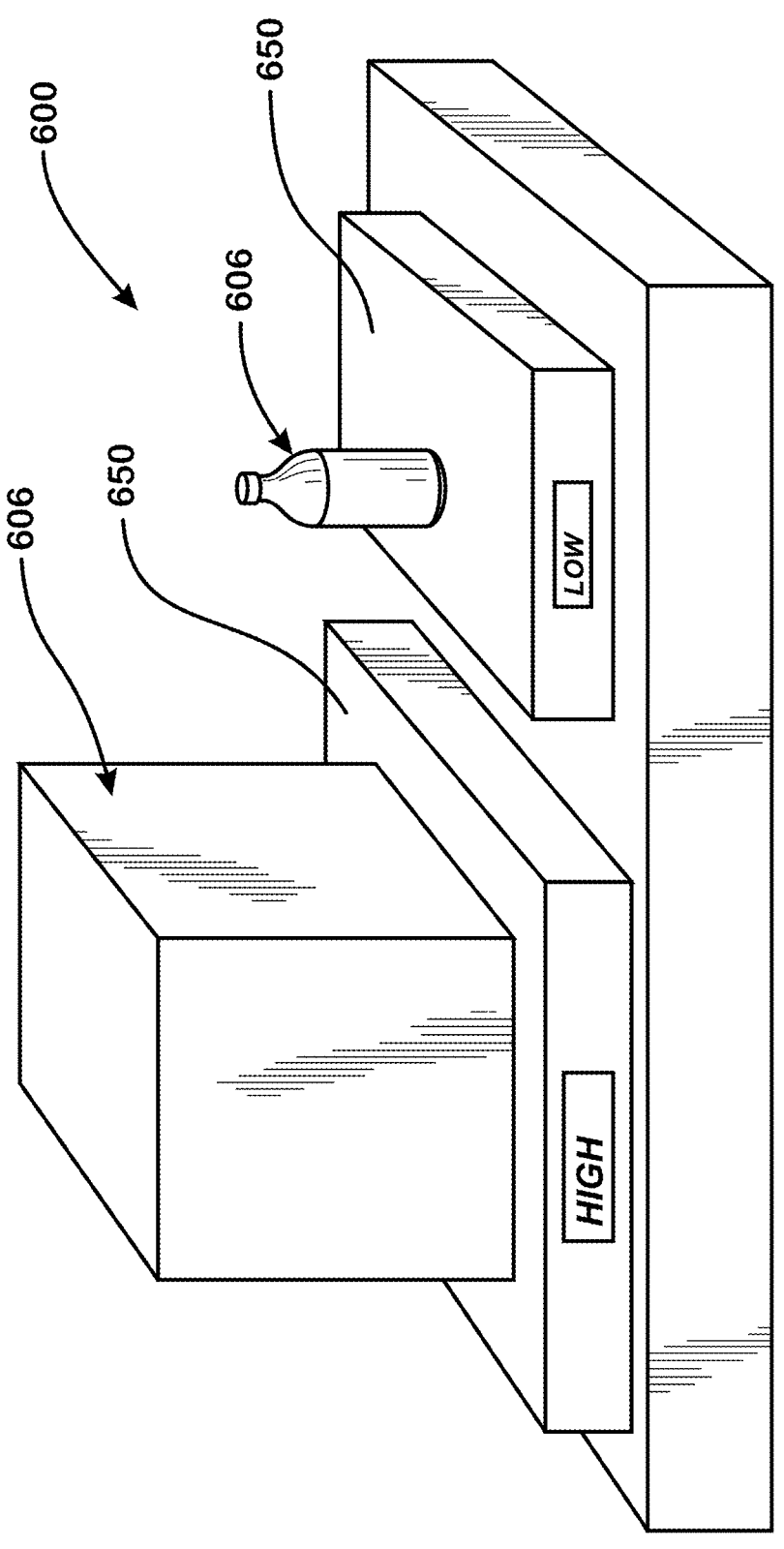
FIG. 24 depicts an appliance that is a smart inventory detector appliance that monitors the remaining product in inventory, according to an embodiment of the invention.

In an embodiment, and with reference to FIG. 24, the smart inventory detector appliance 600 may provide a storage unit in the form of a standard shelf, such as may be found in a shelving unit, or in a cabinet. One or more sensors 650 may be deployed, such as by being placed on the shelf provided for storage of inventory 606, and the sensor 650 is configured to detect changes in mass of an amount of inventory, in such an embodiment, the sensor 650 may be a scale that can log changing values of the mass of the inventory and report the logged information through the communication module to the dashboard system 50. As shown, the sensor 650 is configured to detect an amount of inventory, for example, where the inventory is placed atop the sensor, and the sensor detects the mass of the inventory placed upon the sensor, and as an amount of inventory is removed the sensor will log and report the reduced inventory remaining.

In an exemplary embodiment, the sensor may detect a quantity of product, such as that provided in a box of syrup that is fluidly connected to a soft drink dispenser. Such a product is referred to as a bag in box, and when a new, unused product is placed upon the sensor, the mass value is detected, and the system will recognize that 100% of the inventory is remaining within the container. As product is dispensed, the reduction in volume of the product inventory 606 remaining upon the sensor will be detected, the raw data from the sensor may be logged and optionally processed by the electronics of the smart inventory detector appliance 600 and may be stored in onboard memory. The sensed data values, and/or processed information may then be periodically transmitted by the communication module to report the quantity remaining to the dashboard system 50. As the volume of product is reduced to a threshold value, the appliance 10 may be triggered to send the logged information to the dashboard system 50 and may initiate an alert directed to the designated contact person, and optionally trigger an alarm condition, such as a sound or light.

In another embodiment, the inventory product 606 is one of a plurality of discrete samples, such as individual bottled products, rolls of paper, cleaning supplies, canned goods, small, boxed goods, or even goods that are not necessarily provided in a packaged form, such as produce, for example, apples or oranges, that may merely be provided in an open container. In such an embodiment, the sensor 650 may monitor and log the number of discrete items, rather than track the volume of an amount in a single container. For example, where inventoried product 606 is bottled products, such as where a case of 24 units is placed onto the sensor 650, the weight may be sensed, and a conversion algorithm performed by the electronics of the sensor to determine the number of discrete samples or bottles are provided. This may require the entry of the standard weight of a single discrete sample, such that the conversion of a detected mass could easily be converted to a number of discrete samples, by dividing the current detected mass by the pre-determined discrete sample mass, to provide the quantity of units remaining in inventory. As individual bottles are removed from the inventory on the sensor, the sensor will be configured to track and log the removal of the products. As above, a low inventory condition (e.g., one bottle remaining, as shown) will be logged by the sensor 650. The logged information may be periodically transmitted to the dashboard system, or an alert may be triggered when the low volume/product threshold value is detected, such that a communication may be triggered to provide an alert message/call/text to the designated contact, and optionally provide an alarm condition, as previously described. Alternatively, the user may simply set a minimum threshold value (such as weight or volume) that if detected, may trigger an alert message. In any embodiment, the low threshold sensed condition may initiate an auto-replenishment, according to any of the strategies previously described.

The above example has been provided with reference to tracking the mass of the inventoried product 606, using a scale sensor. It is also recognized that alternative sensors may be substituted, for example, a series of optical detectors may be provided to track the removal of individual product sample, such as bottles, cans, boxes. It is also contemplated that the use of tracking technology, such as RFID may be provided and sensed by an RFID detector system, with the information logged and transmitted in the manner described previously, or smart monitoring systems utilizing artificial intelligence to monitor the inventory stored in a monitored space. Using the teachings herein, one skilled in the art will recognize the alternative sensor types may be provided for monitoring amounts of varied inventory products 606, such that the sensed values associated with a designated storage unit (e.g., appliance 10) may be logged, processed, and transmitted by the smart inventory detector 600, as has been described herein, to the dashboard system 50, as part of a smart monitoring system 1.

The teachings herein may be applicable for any inventory of stored product is placed in a designated storage device, such as a container, or a supporting structure for receiving an amount of product(s), such as a shelf, the sensor may monitor an aspect indicative of the quantity of the product(s) stored, such as the weight or volume of the product(s) within a container or product(s) stored on the structure, and provide a sensor value, that is indicative of the quantity of inventory in the container or on the structure, such as the stored items remaining in the storage area, or the volume of product remaining in a container, based solely on monitoring changes in weight measured. It is contemplated that the appliance may recognize or receive a signal when the designated storage is full, and the sensor may track an aspect that indicates the removal of product(s) to monitor the inventory.

Many other embodiments are possible within the scope and spirit of the invention. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A smart monitoring system comprising a dashboard system, at least one appliance;

the dashboard system providing a general user interface; and a computer connected to the general user interface and having:

a computer readable storage device having a database module for collecting, storing and linking data associated with at least one aspect of at least one appliance, and a central processing unit connected to the general user interface and the computer readable storage device and running a plurality of core modules having:

a user display module providing a title display module, an appliance ID module, a current status module, and a historical status module;

a user alarm module having an alarm condition module;

a user alert module; and a graphic display module;

the at least one appliance having: at least one sensor configured to monitor an aspect of the at least one appliance and provide a series of sensor data comprising a plurality of sequentially sensed values concerning the monitored aspect of the appliance; and a communication module with a processing unit, memory, and a transmission module configured to communicate electronically with the central processing unit of the dashboard system, a current processed data value is treated as a set with a grouping of recent processed data values, and compared to a historical set of previously sensed processed data values, when the recent set and the historical set are compared to each other, an assessment of a condition of the appliance is performed to determine if a value should be logged by recordation within the memory of the system; and the at least one appliance being monitored running a data collection module and transmitting the collected data to the dashboard system.

2. The smart monitoring system of claim 1, wherein the at least one monitored appliance is one or more of refrigerators, freezers, cooking equipment, holding equipment, incubator, warming box, dishwashing machines, ice makers, dish washers, ovens, stoves, microwaves.

3. The smart monitoring system of claim 2, wherein the sensor is at least one of hall effect sensors, reed switches, temperature sensors, humidity sensors, moisture sensors, optical sensors, gyroscopic sensor, accelerometer sensor, and weight sensor.

4. The smart monitoring system of claim 3 wherein the processing unit of the communication module compares the series of sensor data to an expected value range, and the processing unit triggers an alarm condition wherein at least some of the sequentially sensed values of the series of sensor data differs from the expected value range.

5. The smart monitoring system of claim 4, wherein the alarm condition module is configured to activate a detectable alarm.

6. The smart monitoring system of claim 5, wherein the detectable alarm is an audible alarm or warning light.

7. The smart monitoring system of claim 5, wherein the alarm condition module is configured to actuate the user alert module.

8. The smart monitoring system of claim 7, wherein the user alert module provides an alert to one or more designated users, the alert being in the form of a text, call, or email.

9. The smart monitoring system of claim 1, further comprising a maintenance notification module, providing a summary of past maintenance, and an alert as to maintenance being due.

10. The smart monitoring system of claim 9, wherein the maintenance notification module provides a user selectable button to indicate performance of a maintenance action, and reset a maintenance interval timer.

11. The smart monitoring system of claim 1, wherein the at least one appliance monitored is selected from the group consisting of rolled product dispenser, liquid dispenser, refrigerator, freezer, solid good dispenser, storage unit.

12. The smart monitoring system of claim 1, wherein the at least one appliance stores an inventory of product, and the monitored aspect of the at least one appliance is a quantity of product.

13. The smart monitoring system of claim 12, wherein the processing unit of the communication module compares the series of sensor data to an expected value range, and the processing unit triggers a replenishment if the sensor data differs from the expected value range.

14. The smart monitoring system of claim 13, wherein the replenishment comprises an alert triggered by the dashboard system and directed to one or more designated users, the alert being in the form of a text, call, or email.

15. The smart monitoring system of claim 13, wherein the replenishment comprises a replenishment strategy selected from the group consisting of an automatic reorder, a semi-automatic reorder, a semi-manual reorder.

16. The smart monitoring system of claim 15, wherein the replenishment comprises an automatic reorder, and the smart monitoring system will autonomously execute an order of a product.

17. The smart monitoring system of claim 15, wherein the replenishment comprises a semi-automatic reorder, and the smart monitoring system generates an order to be placed after a specified duration of time and provide an alert to a designated user in the form of a text, call, or email.

18. The smart monitoring system of claim 13, wherein the replenishment comprises a semi-manual reorder, and the smart monitoring system generates a pending order, and provide an alert to a designated user in the form of a text, call, or email of the status of the pending order, and the pending order is to become effective only when confirmed by the designated user.

19. A smart monitoring system comprising a dashboard system, at least one appliance;

the dashboard system providing a general user interface; and a computer connected to the general user interface and having:

a computer readable storage device having a database module for collecting, storing and linking data associated with at least one aspect of at least one appliance, and a central processing unit connected to the general user interface and the computer readable storage device and running a plurality of core modules having:

a user display module providing a title display module, an appliance ID module, a current status module, and a historical status module, a current processed data value is treated as a set with a grouping of recent processed data values, and compared to a historical set of previously sensed processed data values, when the recent set and the historical set are compared to each other, an assessment of a condition of the appliance is performed to determine if a value should be logged by recordation within the memory of the system;

a user alarm module having an alarm condition module;

a user alert module; and a graphic display module;

the at least one appliance having: at least one sensor configured to monitor an aspect of the at least one appliance and provide a series of sensor data comprising a plurality of sequentially sensed values concerning the monitored aspect of the appliance; a communication module with a processing unit configured to compare the series of sensor data to an expected sensor value range and trigger a replenishment when the sensor data is outside of the expected sensor value range; memory configured to temporarily log the series of sensor data; and a transmission module configured to communicate electronically with the central processing unit of the dashboard system; and the at least one appliance being monitored running a data collection module and transmitting the collected data to the dashboard system.

20. The smart monitoring system of claim 19, wherein the replenishment comprises a replenishment strategy comprises at least one of initiating an automatic reorder, initiating a semi-automatic reorder, initiating a semi-manual reorder, generating an alert, generating an alarm condition, or combinations thereof.

* * * * *